(12) United States Patent
Toyoda et al.

(10) Patent No.: US 8,717,683 B2
(45) Date of Patent: *May 6, 2014

(54) IMAGE PICKUP APPARATUS HAVING OPTICAL PATH REFLECTING ZOOM LENS

(75) Inventors: Tetsuya Toyoda, Hachioji (JP); Takeshi Hosoya, Machida (JP); Masahito Watanabe, Hachioji (JP); Tomoyuki Satori, Yokohama (JP); Eiji Shirota, Hino (JP)

(73) Assignee: Olympus Imaging Corp., Tokyo (JP)

( * ) Notice: Subject to any disclaimer, the term of this patent is extended or adjusted under 35 U.S.C. 154(b) by 288 days.

This patent is subject to a terminal disclaimer.

(21) Appl. No.: 13/135,090

(22) Filed: Jun. 23, 2011

(65) Prior Publication Data

US 2012/0008214 A1    Jan. 12, 2012

(30) Foreign Application Priority Data

Jul. 7, 2010    (JP) .................................. 2010-155200

(51) Int. Cl.
*G02B 15/14*    (2006.01)

(52) U.S. Cl.
USPC .......................................... 359/686; 359/676

(58) Field of Classification Search
USPC ........ 359/686, 676, 691, 737, 837; 348/240.3
See application file for complete search history.

(56) References Cited

U.S. PATENT DOCUMENTS

| | | | |
|---|---|---|---|
| 6,937,777 B2 | 8/2005 | Shirakawa | |
| 7,215,832 B1 * | 5/2007 | Yamaguchi | 382/305 |
| 7,457,044 B2 * | 11/2008 | Ohzawa et al. | 359/671 |
| 7,561,343 B2 | 7/2009 | Hankawa et al. | |
| 8,120,693 B2 * | 2/2012 | Nomura et al. | 348/335 |
| 2002/0085276 A1 * | 7/2002 | Tanitsu et al. | 359/432 |
| 2002/0094131 A1 | 7/2002 | Shirakawa | |
| 2006/0087707 A1 | 4/2006 | Akaho | |
| 2008/0084615 A1 | 4/2008 | Hankawa et al. | |

FOREIGN PATENT DOCUMENTS

| | | |
|---|---|---|
| JP | 2002-218298 | 8/2002 |
| JP | 2006-121613 | 5/2006 |
| JP | 2008-096559 | 4/2008 |
| JP | 2008-177794 | 7/2008 |

* cited by examiner

*Primary Examiner* — Thomas K Pham
*Assistant Examiner* — Sharrief Broome
(74) *Attorney, Agent, or Firm* — Kenyon & Kenyon LLP

(57) ABSTRACT

An image pickup apparatus includes: a zoom lens; an image pickup element having an image pickup surface which receives an image which has been formed by the zoom lens, and converts to an electric signal; a shading correction parameter storage section which stores a shading correction parameter which differs at a front-surface side and a rear-surface side with respect to a center of an image, which is for correcting asymmetric shading at the front-surface side and the rear-surface side of the zoom lens; and a shading correction section which carries out correction operation of an image which has been picked up by the image pickup element, based on the shading correction parameter of the shading correction parameter storage section. When an object having a uniform brightness is captured, at any state from the wide angle end to the telephoto end, the zoom lens satisfies conditional expression (A).

27 Claims, 25 Drawing Sheets

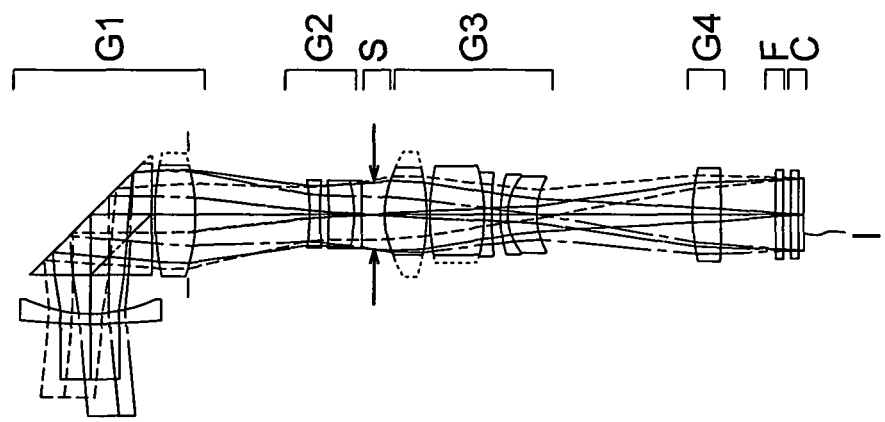

FIG. 3A
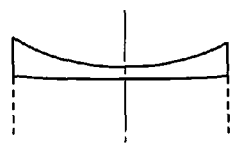
FIG. 3B    FIG. 3C    FIG. 3D
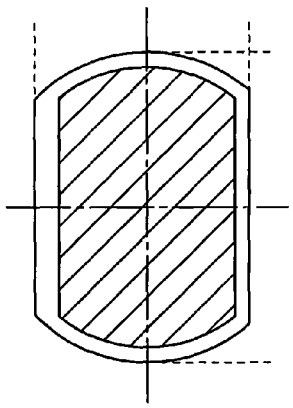 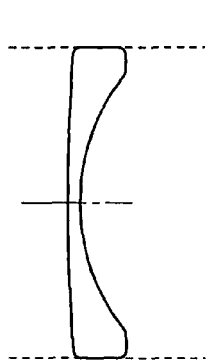 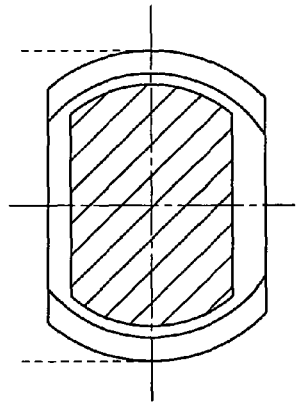

FIG. 20

|  | WIDE ANGLE END | INTERMEDIATE FOCAL LENGTH STATE | TELEPHOTO END | |
|---|---|---|---|---|
| INFINITY | TABLE1 | TABLE2 | TABLE3 | APERTURE OPEN |
| | TABLE4 | TABLE5 | TABLE6 | MINIMUM APERTURE |
| CLOSE DISTANCE | TABLE7 | TABLE8 | TABLE9 | APERTURE OPEN |
| | TABLE10 | TABLE11 | TABLE12 | MINIMUM APERTURE |

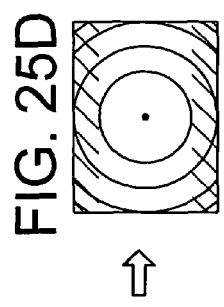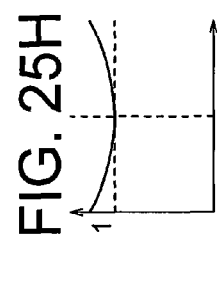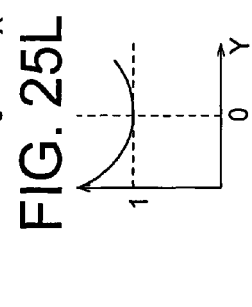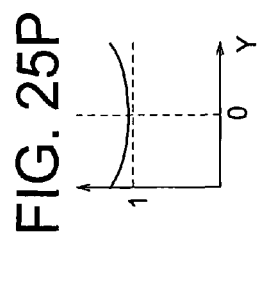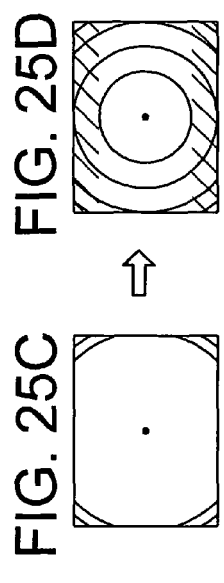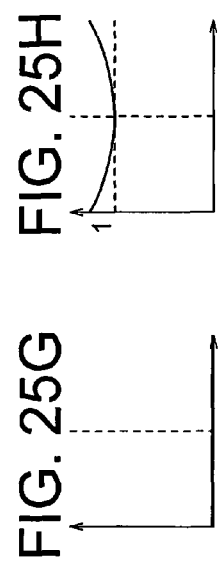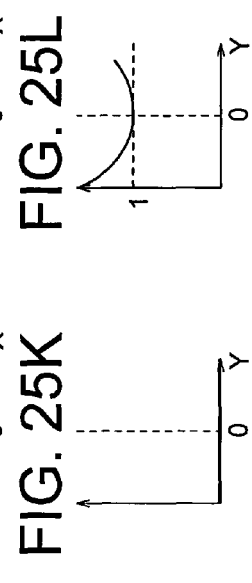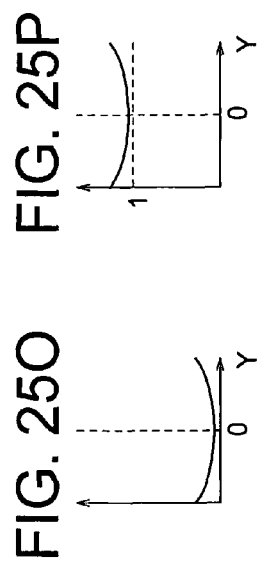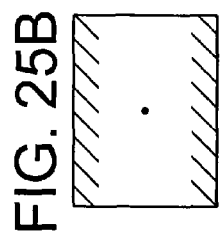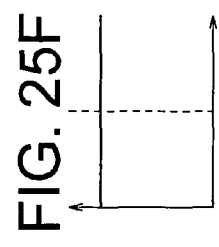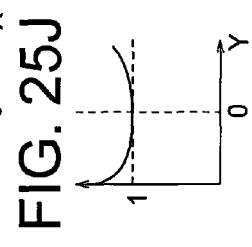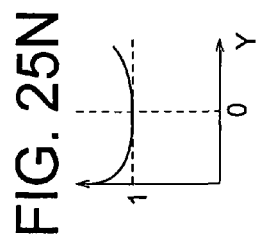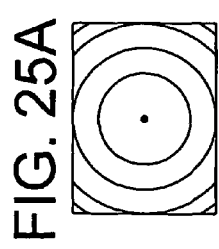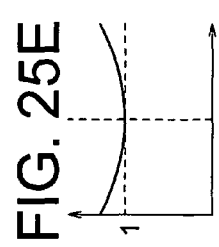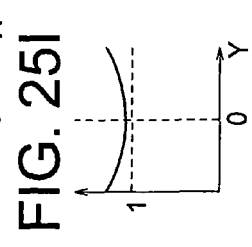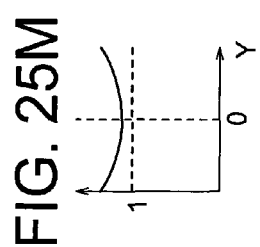

IMAGE PICKUP APPARATUS HAVING OPTICAL PATH REFLECTING ZOOM LENS

CROSS-REFERENCE TO RELATED APPLICATION

The present application is based upon and claims the benefit of priority from the prior Japanese Patent Application No. 2010-155200 filed on Jul. 7, 2010; the entire contents of which are incorporated herein by reference.

BACKGROUND OF THE INVENTION

1. Field of the Invention

The present invention relates to an image pickup apparatus having an optical path reflecting zoom lens.

2. Description of the Related Art

A zoom lens in which, an object-side lens unit having a reflecting surface, and a lens unit which moves in an optical axial direction at the time of zooming from a wide angle end to a telephoto end disposed on an image side than the object-side lens unit, are disposed has been disclosed in Japanese Patent Application Laid-open Publication No. 2008-96559.

Furthermore, an image pickup apparatus in which an opening portion of an aperture stop is let to be elliptical-shaped, and a shape of a lens after reflecting is let to be an oval shape for achieving both, a slimming of a zoom lens and a reduction of cost, has been disclosed in Japanese Patent Application Laid-open Publication No. 2008-96559.

SUMMARY OF THE INVENTION

An image pickup apparatus according to the present invention includes
a zoom lens, and
an image pickup element, and
the image pickup element includes an image pickup surface which receives an image which has been formed by the zoom lens, and which converts the image received, to an electric signal, and
the zoom lens includes
an object-side lens unit which includes
a prism having a reflecting surface which reflects an optical path,
an object-side sub lens unit having a negative refractive power, which is disposed on an object side than the prism,
an aperture stop which is disposed on an image side than the object-side lens unit, and
a first zoom lens unit having a positive refractive power, which is disposed on the image side than the aperture stop, and which is moved to carry out zooming, to come closer to the aperture stop, at the telephoto end than at the wide angle end, and
a position of the object-side lens unit is fixed at the time of zooming from the wide angle end to the telephoto end, and the object-side lens unit is a lens unit which is disposed nearest to the object side, and
when a surface which includes an incident-light axis of light incident on the reflecting surface and a reflected-light axis of light upon being reflected at the reflecting surface is defined as a reference surface, and
a side of the incident-light axis with respect to the reflected-light axis is defined as a front-surface side, and
a side opposite to the front-surface side with respect to an optical axis after the reflection is defined as a rear-surface side,
the image pickup element has an effective image pickup area of a rectangular shape having a short side and a long side, and
the short side of the effective image pickup area is parallel to the reference surface, and
the first zoom lens unit has an object-side lens which is disposed nearest to the aperture stop in the first zoom lens unit, and
the object-side lens in the first zoom lens unit has an outer shape which is a non-circular shape of which, the front-surface side and the rear-surface side are cut partly, and
an outer size of the object-side lens, in a direction from an optical axis toward the front-surface side is smaller than an outer size of the object-side lens in a direction from the optical axis toward the rear-surface side, and
when an object having a uniform brightness is captured, the zoom lens, at any state from the wide angle end to the telephoto end, satisfies the following conditional expression (A), and furthermore,
the image pickup apparatus comprises
a shading correction parameter storage section which stores a shading correction parameter which differs at the front-surface side and the rear-surface side with respect to a center of an image, which is for correcting asymmetric shading at the front-surface side and the rear-surface side of the zoom lens, and
a shading correction section which carries out correction operation of an image which has been picked up by the image pickup element, based on the shading correction parameter stored in the shading correction parameter storage section, $$0.02 < EV_r - EV_f < 2.0 \tag{A}$$

where,
$EV_f$ is a value obtained by subtracting an EV value at the maximum image height of the front-surface side along the reference surface at the wide angle end from an EV value in an axial region, and
$EV_r$ is a value obtained by subtracting an EV value at the maximum image height of the rear-surface side along the reference surface at the wide angle end, from the EV value in the axial region.

BRIEF DESCRIPTION OF THE DRAWINGS

FIG. 2 is a cross-sectional view with an optical path, at a telephoto end of the zoom lens in the image pickup apparatus according to the first embodiment;

FIG. 3A, FIG. 3B, FIG. 3C, and FIG. 3D are diagrams indicating an effective area and a shape of an object-side sub lens unit in a first lens unit (an object-side lens unit) in the zoom lens in the image pickup apparatus according to the first embodiment;

FIG. 20 is a diagram showing contents of a table of the correction parameters;

FIG. 25A to FIG. 25P are diagrams showing schematically steps of calculating the correction parameters.

DETAILED DESCRIPTION OF THE PREFERRED EMBODIMENTS

Figure 1A:
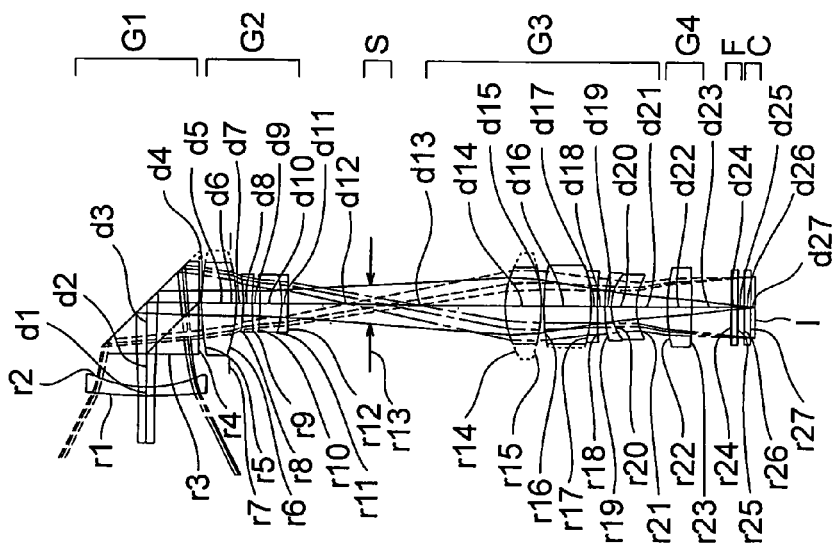
FIG. 1A is a cross-sectional view with an optical path, at a wide angle end of a zoom lens in an image pickup apparatus according to a first embodiment.

An image pickup apparatus according to the present invention includes a zoom lens which includes an object-side lens unit having a prism having a reflecting surface which reflects an optical path, and an object-side sub lens unit having a negative refractive power, which is disposed on an object side than the prism, and of which, a position is fixed at the time of zooming from a wide angle end to a telephoto end, an aperture stop which is disposed on an image side than the object-side lens unit, and which restricts an axial light beam, a first zoom lens unit having a positive refractive power, which is disposed on the image side than the aperture stop, and which is moved to carry out zooming, to come closer to the aperture stop, at the telephoto end than at the wide angle end, and the object-side lens unit is a lens unit which is disposed nearest to the object side, and an image pickup element which has an image pickup surface which receives an image which has been formed by the zoom lens, and which converts the image received, to an electric signal, and when a surface which includes an incident-light axis of light incident on the reflecting surface and a reflected-light axis of light upon being reflected at the reflecting surface is defined as a reference surface, and a side of the incident-light axis with respect to the reflected-light axis is defined as a front-surface side, and a side opposite to the front-surface side with respect to an optical axis after the reflection is defined as a rear-surface side, the image pickup element has an effective image pickup area of a rectangular shape having a short side and a long side, and the short side of the effective image pickup area is parallel to the reference surface, and the first zoom lens unit has an object-side lens which is disposed nearest to the aperture stop in the first zoom lens unit, and the object-side lens in the first zoom lens unit has an outer shape which is a non-circular shape of which, the front-surface side and the rear-surface side are cut partly, and an outer size of the object-side lens, in a direction from an optical axis toward the front-surface side is smaller than an outer size of the object-side lens in a direction from the optical axis toward the rear-surface side, and when an object having a uniform brightness is captured, the zoom lens, in any state from the wide angle end to the telephoto end, satisfies the following conditional expression (A), and furthermore, the image pickup apparatus includes a shading correction parameter storage section which stores a shading correction parameter which differs at the front-surface side and the rear-surface side with respect to a center of an image, which is for correcting asymmetric shading at the front-surface side and the rear-surface side of the zoom lens, and a shading correction section which carries out correction calculation of an image which has been picked up by the image pickup element, based on the shading correction parameter stored in the shading correction parameter storage section, $$0.02 < EV_r - EV_f < 2.0 \tag{A}$$

where, $EV_f$ is a value obtained by subtracting an EV value at the maximum image height of the front-surface side along the reference surface at the wide angle end from an EV value in an axial region, and $EV_r$ is a value obtained by subtracting an EV value at the maximum image height of the rear-surface side along the reference surface at the wide angle end, from the EV value in the axial region.

A zoom lens of a type which reflects the optical path is advantageous for slimming of the image pickup apparatus. Disposing the sub lens unit having a negative refractive power on the object side than the reflecting surface is advantageous for securing an angle of field at the wide angle end. Using a prism as a reflecting member is advantageous for slimming, and for making an optical path small by a refraction effect.

The zooming is carried out by moving the zoom lens unit (the first zoom lens unit) having a positive refractive power, which has been disposed on the image side than the aperture stop. Here, when an attempt is made to secure a zoom ratio, the zoom lens unit moves away from the aperture stop, at the wide angle end. Therefore, a position through which, an off-axis chief ray passes, moves away from the optical axis.

Therefore, in the present invention, by letting the direction of the short side of the effective image pickup area to be parallel to the reference surface, it is possible to small a height of incidence of a chief ray in a cross direction which is a direction from the front-surface side to the rear-surface side. However, by the zoom lens unit moving away from the aperture stop, the off-axis light beam is susceptible to become thick.

Therefore, even when a shape of the lens nearest to the object side in the zoom lens unit is let to be a shape missing the front-surface side and the rear-surface side (partly) of the lens outer shape, the light beam is shielded perfectly in few cases.

Therefore, in the present invention, by structuring the zoom lens as mentioned above, the structure is let to be advantageous for slimming.

Here, members such as a frame which holds a lens, a light shielding member, and an interference member are to be disposed. Therefore, securing a space on the front-surface side of the zoom lens unit is preferable from a view point of small-sizing of the overall image pickup apparatus.

On the other hand, when an optical system is slimmed, asymmetric shading is susceptible to occur in the direction of the short side of the image pickup element in any state in between or all the states from the wide angle end to the telephoto end.

Such asymmetric shading can be corrected by correcting by signal processing, an exposure difference which occurs due to vignetting of a light beam, by using a parameter for correcting brightness which differs at the front-surface side and the rear-surface side of the center of the image, and it is possible to achieve a favorable image.

At this time, it is preferable to carry out adjustment such that conditional expression (A) is satisfied for the asymmetric shading by the zoom lens.

It is preferable to facilitate slimming of the front-surface side of the zoom lens by making an arrangement such that a lower limit value of conditional expression (A) is not surpassed. Whereas, it is preferable to make easy to suppress (reduce) noise when the shading has been corrected electrically, by making an arrangement such that an upper limit value of conditional expression (A) is not surpassed.

By making such an arrangement, it is possible to provide an image pickup apparatus which includes a zoom lens which bends an optical path which makes it easy to carry out slimming while securing optical performance.

Furthermore, in the abovementioned description, it is preferable that any one or a plurality of the following conditional expressions is satisfied simultaneously.

It is preferable that the object-side lens in the first zoom lens has an object-side lens surface which satisfies the following conditional expressions (1), (2), and (3).

$$Lv1Er/Lv1EL < 0.49 \tag{1}$$

$$0.93 < Lv1Ef/IHs \tag{2}$$

$$Lv1Ef/Lv1Er < 0.99 \tag{3}$$

where,

Lv 1 Er denotes a length of an area of the rear-surface side measured along the reference surface from the optical axis, in an effective area of the object-side lens surface of the object-side lens in the first zooming lens unit, Lv 1 EL denotes a length of an area measured along a direction perpendicular to the reference surface including the optical axis in the effective area of the object-side lens surface of the object-side lens in the first zooming lens unit, Lv 1 Ef denotes a length of an area of the front-surface side measured along the reference surface from the optical axis, in the effective area of the object-side lens surface of the object-side lens in the first zooming lens unit, and IHs denotes the maximum image height in a direction along the reference surface out of an effective image pickup area.

Conditional expression (1) is a conditional expression which specifies preferable Lv 1 Er.

Moreover, conditional expressions (2) and (3) are conditional expressions which specify preferable Lv 1 Ef, and are rewritten as the following expression which satisfies both at the same time.

$$0.93 \times IHs < Lv1Ef < 0.99 \times Lv1Er \tag{2.3}$$

When upper limit values of conditional expression (1) and conditional expressions (2) and (3) are surpassed, an efficiency of securing space is reduced, and an advantage of slimming is low.

When lower limit values of conditional expressions (2) and (3) are surpassed, it is advantageous for small-sizing, but it becomes difficult to secure an amount of light near the maximum image height of the direction of the short side. Moreover, a ghost image due to internal reflection at an end portion of the lens is susceptible to occur.

According to a preferable aspect of the present invention, it is desirable that the prism has en outer shape of which, the rear-surface side is cut partially.

An off-axis light beam at prism becomes thin near the wide angle end, whereas becomes thick near the telephoto end. However, it is desirable to keep a surface on an incidence side of the prism large for securing an angle of field near the wide angle end. Moreover, an effective surface of a surface on an output side is susceptible to be smaller than an effective surface on the incidence side.

Therefore, even when the outer shape is let to have the rear-surface side missing partially, an effect on the image is suppressed, and it is possible to reduce a thickness in a direction of thickness of the prism.

Furthermore, it is preferable to make the following arrangement.

It is desirable that the object-side lens unit includes an image-side sub lens unit having a positive refractive power, which is disposed on the image side than the prism, and that both the prism and the image-side sub lens unit have an outer shape of which, the rear-surface side is missing.

By disposing the image-side sub lens unit having a positive refractive power in such manner, it becomes easy to make a light beam inside the prism small, and also it is advantageous for reduction of aberration of the object-side lens unit.

At this time, due to the shape having the rear-surface side of the prism missing, by letting the image-side sub lens unit having a shape in which, the rear-surface side is missing similarly, it is advantageous for slimming.

Furthermore, it is desirable that the image pickup apparatus satisfies the following conditional expression (4-1).

$$PeO<PEr<PEf \quad (4-1)$$

where,

PEr denotes a length of an area of the rear-surface side measured along the reference surface from the optical axis, in an effective area of an exit surface of the prism in the object-side lens unit, PeO denotes a length from the optical axis of a light ray which passes the nearest position from the optical axis, in the exit surface of the prism, from among light rays which are incident at the maximum image height of the front-surface side on the reference surface at the wide angle end, and PEf denotes a length of an area of the front-surface side measured along the reference surface from the optical axis, in the effective area of the exit surface of the prism in the object-side lens unit.

Conditional expression (4-1) is a conditional expression which specifies preferable PEr.

When a lower limit value of conditional expression (4-1) is surpassed, it is disadvantageous for securing an area of an image which is formed. Moreover, due to reduction in the amount of light, noise at the time of reproducing the image is susceptible to be remarkable.

When an upper limit value of conditional expression (4-1) is surpassed, an effect of slimming becomes small.

Moreover, according to a preferable aspect of the present invention, it is desirable that the image pickup apparatus satisfies the following conditional expression (4-2).

$$Pec \leq PEr \quad (4-2)$$

where,

PEr denotes the length of the area of the rear-surface side measured along the reference surface from the optical axis in the effective area of the exit surface of the prism in the object-side lens unit, and Pec denotes a length from the optical axis of a position through which a chief ray which is incident at the maximum image height of the front-surface side on the reference surface at the wide angle end passes through the exit surface of the prism.

Conditional expression (4-2) is a conditional expression which specifies more preferable PEr.

Making an arrangement such that PEr does not surpass Pec is advantageous for securing an amount of light of a light beam which is incident at an end in the direction of the short side. Moreover, it is possible to secure an image height when an aperture size of the aperture stop is changed.

Moreover, according to a preferable aspect of the present invention, it is desirable that the image pickup apparatus satisfies the following conditional expression (4-3).

$$Pem \leq PEr \quad (4-3)$$

where,

PEr denotes the length of the area of the rear-surface side measured along the reference surface from the optical axis, in the effective area of the exit surface of the prism in the object-side lens unit, and Pem denotes a length of an area of the front-surface side along the reference surface from the optical axis in the effective area of the exit surface of the prism at the wide angle end.

Making an arrangement such that a lower limit value of conditional expression (4-3) is not surpassed is advantageous for securing the amount of light of the light beam incident on the end in the direction of the short side at the wide angle end.

Moreover, according to a preferable aspect of the present invention, it is desirable that the image pickup apparatus satisfies the following conditional expression (6).

$$0.90<L1rEr/PEr<1.1 \quad (6)$$

where, $L1rEr$ denotes a length of an area on the rear-surface side measured along the reference surface from the optical axis, in an effective area of a lens surface on the object side in the image-side sub lens unit in the object-side lens unit, and PEr denotes the length of the area of the rear-surface side measured along the reference surface from the optical axis in the effective area of the exit surface of the prism in the object-side lens unit.

By making an arrangement such that a lower limit value of conditional expression (6) is not surpassed, it is easy to reduce vignetting due to the image-side sub lens unit.

Making an arrangement such that an upper limit value of conditional expression (6) is not surpassed is advantageous for slimming in the direction of thickness.

Moreover, according to a preferable aspect of the present invention, it is desirable that the image-side sub lens unit in the object-side lens unit has a non-circular shape of which, the front surface side and the rear-surface side are missing partially, and an outer size of the image-side sub lens unit, in the direction from the optical axis toward the front-surface side is larger than an outer side lens in the direction from the optical axis toward the rear-surface side.

Making the rear-surface side of the image-side sub lens unit partially missing is advantageous for slimming. On the other hand, by the front-surface side of the image-side sub lens unit missing partially, it is easy to arrange the negative lens unit. Here, excessive missing does not lead to slimming. Therefore, to make it easy to secure the amount of light, it is preferable to let a size of the outer shape in a frontward direction larger than a size in a direction of the rear-surface side.

Moreover, according to a preferable aspect of the present invention, it is desirable that the object-side lens in the first zooming lens unit has an object-side lens surface which satisfies the following conditional expression (7).

$$0.70<Lv1Er/PEr<0.98 \quad (7)$$

where,

PEr denotes the length of the area of the rear-surface side measured along the reference surface from the optical axis, in the effective area of the exit surface of the prism in the object-side lens unit, and $Lv1Er$ denotes the length of the area of the rear-surface side measured along the reference surface from the optical axis, in the effective area of the object-side lens surface of the object-side lens in the first zooming lens unit.

By making an arrangement such that a lower limit value of conditional expression (7) is not surpassed, it is easy to suppress a reduction in an amount of light at the end in the short-side direction due to vignetting in the first zoom lens unit.

On the other hand, taking into consideration disposing of a frame which holds and moves the zoom lens unit and a holding frame of the overall zoom lens, it is preferable to make an effective area of the prism at the rear-surface side smaller than an effective area of the zoom lens unit such that an upper limit of conditional expression (7) is not surpassed.

According to a preferable aspect of the present invention, it is desirable that the object-side lens unit has a positive refractive power, and the zoom lens includes a second zoom lens unit having a negative refractive power, which is disposed between the object-side lens unit and the aperture stop, and which is moved to carry out zooming, to come closer to the aperture stop, at the telephoto end than at the wide angle end, and a lens unit having a positive refractive power, which is disposed on the image side of the first zoom lens unit, and no other lens unit is provided between the first zoom lens unit and the second zoom lens unit.

Disposing the second zoom lens unit is advantageous for achieving even higher zoom ratio while suppressing a range of movement of the first zoom lens unit.

By disposing the lens unit having a positive refractive power on the image side of the first zoom lens unit, it is easy to move an exit pupil away from the image plane, and it becomes easy to suppress shading in a portion around an area in an image taken.

As compared to a case of disposing a fixed positive lens near the aperture stop, it is easy to reduce the number of lens groups and to reduce an effect due to decentering, and the yield is improved.

Moreover, according to a preferable aspect of the present invention, it is desirable that the first zoom lens unit includes a plurality of positive lens components which are arranged in a row on the object side, and of which, an object-side surface is a convex surface, and a negative lens component which is disposed on the image side than the plurality of positive lens components, and of which, an image-side surface is a concave surface.

A light beam is incident upon being diverged. However, converging the light beam by the plurality of positive lens components on the object side, and making the off-axis light beam refract in a direction away from the optical axis by disposing the negative lens component of which, the image-side surface is a convex surface, on the image side than the positive lens component, leads to small-sizing of the zoom lens unit.

The lens component is a lens body of which, effective surfaces in contact with air are only two namely, an object-side surface and an image-side surface, and means a single lens or a cemented lens.

Moreover, according to a preferable aspect of the present invention, it is desirable that the zoom lens satisfies the following conditional expression (8).

$$3.4 < fT/fW \qquad (8)$$

where, fT denotes a focal length of the zoom lens at the telephoto end, and fW denotes a focal length of the zoom lens at the wide angle end.

It is preferable to secure a zoom ratio by making an arrangement such that a lower limit value of conditional expression (8) is not surpassed. It is easy to show a advantage of small-sizing by using the lens having a shape as in the present invention.

Furthermore, it is preferable that the abovementioned zoom lens satisfies the following conditional expression (8-1).

$$50° > \omega W > 38.0° \qquad (8-1)$$

where

ωW denotes the maximum half angle of field of the zoom lens at the wide angle end.

It is preferable to secure an angle of field by making an arrangement such that a lower limit value of conditional expression (8-1) is not surpassed.

It is preferable to reduce vignetting by making arrangement such that an upper limit value of conditional expression (8-1) is not surpassed.

According to a preferable aspect of the present invention, it is desirable that a center of the image pickup surface of the image pickup element is positioned on the front-surface side with respect to a center of the effective image pickup area, and the image pickup apparatus includes a display monitor which is disposed on the rear-surface side of the zoom lens.

Shifting the center of the image pickup surface of the image pickup element toward the front-surface side than the optical axis of the zoom lens leads to securing of space on the rear-surface side, and it is possible to suppress the thickness of the image pickup element even when a large-size display monitor is disposed on the rear-surface side.

Moreover, according to a preferable aspect of the present invention, taking into consideration an asymmetric exposure difference which changes according to a change in zooming of the zoom lens and an area of the aperture of the aperture stop, it is desirable that the correction parameter storage section stores correction parameter which differ for the front-surface side and the rear-surface side corresponding to respective states.

Accordingly, the correction is possible according to the asymmetric exposure difference which changes according to the state of the zoom lens, and therefore it is preferable.

Apart from this, in order to correct a change in an asymmetric image which occurs due to asymmetric vignetting, it is preferable to correct a difference in shading, a difference in image distortion, and a difference in a depth of field of a surrounding portion by image processing.

Moreover, it is preferable to carry out correction in which, vignetting corresponding to a photometric area and a focusing area is taken into consideration.

Furthermore, an arrangement may be made such that an image processing is carried out in advance to reduce an effect due to asymmetry of vignetting, and thereafter, an image conversion of a filter effect due to the image processing may be carried out.

According to a preferable aspect of the present invention, it is desirable that when the aperture stop is open at the wide angle end, the zoom lens satisfies the following conditional expression (9).

$$-3.5 < EV_{c-f} < -0.7 \qquad (9)$$

where, $EV_{c-f}$ is a value obtained by subtracting an EV value at the maximum image height of the front-surface side along the reference surface at the wide angle end from an EV value in the axial region at the wide angle end.

By making an arrangement such that a lower limit value of conditional expression (9) is not surpassed, it becomes easy to reduce an occurrence of noise due to correction of an amount of exposure by signal processing.

Making an arrangement such that an upper limit value of conditional expression (9) is not surpassed is advantageous for securing a space on the front-surface side of the first zoom lens unit.

In a case in which, the zoom lens has a focusing mechanism, each of the abovementioned arrangement is let to be an arrangement when focused to the longest distance.

It is preferable that each of the abovementioned conditional expressions is satisfied separately or a plurality of abovementioned conditional expressions is satisfied simultaneously.

Letting each of numerical data to be as follows leads to even more assured effect, and it is preferable to use the following numerical data.

The lower limit value of 0.05 in conditional expression (A) is more preferable, and the lower limit value of 0.10 is even more preferable from a point of small-sizing. It is preferable to let the upper limit value to be 1.0, and further to be 0.5, as it is possible to reduce a noise difference at an upper end and a lower end of the photographic screen.

It is preferable to let the upper limit value in conditional expression (1) to be 0.46.

It is preferable to let the lower limit value in conditional expression (2) to be 0.95 and 0.97, and the lower limit value of 1.00 is even more preferable.

It is preferable to let the upper limit value in conditional expression (3) to be 0.975.

It is preferable to let a lower limit value in conditional expression (6) to be 0.95, and the lower limit value of 0.99 is more preferable.

It is preferable to let an upper limit value in conditional expression (6) to be 1.05, and the upper limit value of 1.01 is more preferable.

It is preferable to let a lower limit value in conditional expression (7) to be 0.73, and the lower limit value of 0.85 is more preferable.

It is preferable to let an upper limit value in conditional expression (7) to be 0.95, and the upper limit value of 0.92 is more preferable.

It is preferable to let a lower limit value in conditional expression (8) to be 4.5.

An upper limit value of 15.0 may be provided in conditional expression (8), and an arrangement may be made such that the upper limit value of 15.0 is not surpassed.

It becomes easy to suppress an increase in a size of the zoom lens along the optical axis, and it is advantageous for small-sizing in a direction other than the direction of thickness of the image pickup apparatus. Furthermore, the upper limit value may be let to be 10.0.

It is preferable to let a lower limit value in conditional expression (9) to be −2.5, and the lower limit value of −2.0 is more preferable.

It is preferable to let an upper limit value in conditional expression (9) to be −1.0, and the upper limit value of −1.5 is more preferable.

Next, a more preferable arrangement for correction of the asymmetric shading will be described below.

It is preferable that the image pickup apparatus includes a shading correction parameter calculating section which calculates a shading correction parameter corresponding to each of the pixels which have been arranged in rows two-dimensionally on the flat surface of the image pickup element, based on the shading correction parameters stored in the shading correction parameter storage section, and the shading correction parameter is calculated by an operation of interpolating the shading correction parameter corresponding to pixels, not stored in advance, and the shading correction section carries out correction operation upon extracting a shading correction coefficient related to the corresponding pixel from the shading correction parameter which has been calculated in the shading correction parameter calculating section from luminance data which has been selected from each pixel of the image pickup element.

Without storing the interpolation coefficient for each pixel, by calculating the interpolation coefficient corresponding to a pixel not having the correction coefficient by a linear interpolation or a non-linear interpolation based on an correction coefficient corresponding to a pixel around that pixel, it is possible to save a storage capacity of the shading correction parameter storage section.

The shading correction parameter is calculated by an asymmetrically continuous distribution in the direction of the short side of the image pickup element. In the calculation of the correction parameter it is preferable to let a correction-parameter distribution of a plurality of orders upon taking into consideration a trend of shading due to vignetting.

For instance, when the direction of the long side is let to be an X-axis, the direction of the short side is let to be a Y-axis, and the center of the image pickup surface is let to be an origin, distribution of a correction parameter z can be let to be as follows.

$$z = C_j + C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

Provided that, $C_j$ (j is an integer not less than 1) is a coefficient.

In the abovementioned coefficient distribution, generally, both an X-Z plane and a Y-Z plane have no symmetrical plane. However, by letting all odd-number order of X to be 0, it becomes a correction-parameter distribution in which only the Y-Z plane is let to be a symmetrical plane. For example, in the abovementioned expression (b), this is possible by making a coefficient of each of the terms $C_2, C_5, C_7, C_9, C_{12}, C_{14}, C_{16}, C_{18}, C_{20}, C_{23}, C_{25}, C_{27}, C_{29}, C_{31}, C_{33}, C_{35}, \ldots$ to be 0.

Regarding the interpolation, an arrangement may be made such that the correction coefficients are interpolated according to shading characteristics which change according to a change in a focal length, an object point distance of a focused focal point, and an F value etc.

According to a preferable aspect of the present invention, it is desirable that in a shading correction parameter distribution in the direction of the short side of the image pickup element, a difference with a shading correction coefficient in a near optical axis area for shading correction parameter near an end of the front surface side is more than for shading correction parameter near an end of the rear-surface side in the direction of the short side on the reference surface.

Moreover, according to a preferable aspect of the present invention, it is desirable that the shading correction section corrects by multiplying, the shading correction parameter for the luminance data.

Moreover, according to a preferable aspect of the present invention, it is desirable that the shading correction parameter calculating section includes a shading correction parameter modifying section which modifies the shading correction parameter according to at least one of a zooming state of the zoom lens, a focusing state of the zoom lens, and an aperture value, and transmits the shading correction parameter which has been modified, to the shading correction section.

Accordingly, by interpolating the correction parameter, it is possible to save the storage capacity of the shading correction parameter storage section, and therefore it is preferable.

For instance, based on a shading correction parameter at the wide angle end which has been stored in the shading correction parameter storage section, the correction-parameter distribution at the wide angle end is to be calculated, and based on a shading correction parameter in the intermediate focal length state, the correction-parameter distribution in the intermediate focal length state is to be calculated.

Moreover, by interpolating correction data such as by letting the correction-parameter distribution between the wide angle end and the intermediate focal length state to be an average value of the two distributions, it is possible to save the storage capacity of the shading correction parameter storage section, and therefore it is preferable.

Here, at the time of calculating the average value of the two distributions, it is all the more preferable to carry out the correction upon taking into consideration an effect of vignetting, in a precise sense.

As an example, correction parameters in total of 12 states namely, at the wide angle end, the intermediate focal length state, and the telephoto end, when focused to infinite object point, and at the wide angle end, the intermediate focal length state, and the telephoto end, when focused to an object at a close distance, when the aperture is opened, and when the aperture is narrowed to the minimum, are to be stored. Moreover, it is preferable to carry out arithmetic interpolation according to an arbitrary zoom state, focusing state, and the amount of opening of aperture.

According to a preferable aspect of the present invention, it is desirable that the image pickup apparatus includes a distortion correction section which carries out an arithmetic correction of a distortion after the correction calculation by the shading correction section.

When a phenomenon which occurs axially rotationally symmetrically is corrected first, correction of shading which occurs non-rotationally symmetrically becomes complicated. Therefore, by correcting a phenomenon which occurs non-rotationally symmetrically with respect to the optical axis first, an accuracy of image processing is improved. The distortion of the zoom lens is acceptable and it is advantageous for small-sizing.

Moreover, according to a preferable aspect of the present invention, it is desirable that the shading correction parameter storage section holds shading correction parameters corresponding to each of red, green, and blue colors of the image pickup element, and the shading correction section carries out shading correction operation based on luminance data of each of red, green, and blue colors.

Accordingly, imparting a correction coefficient corresponding to each color of the image pickup element is advantageous for suppressing color shading.

Moreover, according to a preferable aspect of the present invention, it is desirable that the shading correction parameter calculating section calculates an inverse function of shading characteristics, as a shading correction parameter, and the shading correction section carries out correction by multiplying the luminance data which has been selected from each of the pixels of the image pickup element, by the shading correction parameter.

Accordingly, the correction of shading can be carried out by the luminance of an area in which the shading occurs being amplified according to the degree of shading.

Moreover, the following arrangement may be made for the correction parameter of the shading correction parameter storage section.

According to a preferable aspect of the present invention, it is desirable that the shading correction parameter storage section stores a shading correction parameter which indicates a rotationally symmetric distribution with the optical axis as a center, and a shading correction parameter which indicates a non-rotationally symmetric distribution with respect to a center of the optical axis, and the shading correction parameter calculating section includes a shading correction parameter adding section which calculates a shading correction parameter by adding the shading correction parameter which becomes the rotationally symmetric distribution and the shading correction parameter which becomes the non-rotationally symmetric distribution, and the shading correction section carries out correction by multiplying the intensity data which has been selected from each of the pixels of the image pickup element, by the shading correction parameter which has been calculated by the shading correction parameter calculating section.

Accordingly, a degradation of oblique incident light in the optical system, a shading tendency according to cosine fourth law becomes almost rotationally symmetric with the optical axis as a center.

However, the shading tendency by the image pickup element is not restricted to be rotationally symmetric, and in the abovementioned zoom lens, shading characteristics in an area at the end in the direction of the short size are non-rotationally symmetric shading characteristics. Since the correction coefficient of the rotationally symmetric shading can be calculated by working out, it is possible to reduce a storage capacity of the storage section which stores the correction coefficient, which is advantageous for a cost reduction and for an increase in a processing speed.

Moreover, according to a preferable aspect of the present invention, It is desirable that the shading correction parameter which indicates the rotationally symmetric distribution, of the shading correction parameter storage section is a shading correction parameter corresponding to an image height, and the shading correction parameter calculating section calculates the shading correction parameter which becomes the rotationally symmetric distribution, based on a distance from a center of the image pickup surface up to a target pixel, and calculates the shading correction parameter by adding the shading correction parameter which becomes the rotationally symmetric distribution, and the shading correction parameter which becomes the non-rotationally symmetric distribution.

Accordingly, since the distribution of the rotationally symmetric shading correction parameter can be let to be a function of an image height from a center of the image pickup surface, it is possible to reduce the storage memory of the storage section which stores the correction parameters, and which is advantageous for cost reduction and for an increase in the processing speed.

Moreover, according to a preferable aspect of the present invention, it is desirable that the image pickup apparatus includes a noise correction parameter calculating section which generates a noise correction parameter of an asymmetric correction-parameter distribution in the direction of the short side of the image pickup element, based on the shading correction parameter, and a noise correction section which carries out a noise correction process by using the noise correction parameter.

When the shading correction is carried out, higher an amplification factor of the luminance, there is an occurrence of noise in that area. When the asymmetric shading occurs, asymmetric noise distribution occurs together with the shading correction. In this case, when the noise correction is carried out uniformly, the asymmetric noise distribution remains. Therefore, by carrying out the noise correction based on the shading distribution, it is possible to improve an image quality.

Moreover, according to a preferable aspect of the present invention, it is desirable that the image pickup apparatus includes an interference member which is disposed on the front-surface side of the zoom lens.

Accordingly, absorption of an impact and small-sizing of the image pickup apparatus are possible.

Exemplary embodiments of the image pickup apparatus according to the present invention will be described below in detail by referring to the accompanying diagrams. However, the present invention is not restricted to the embodiments described below.

Figure 1B:
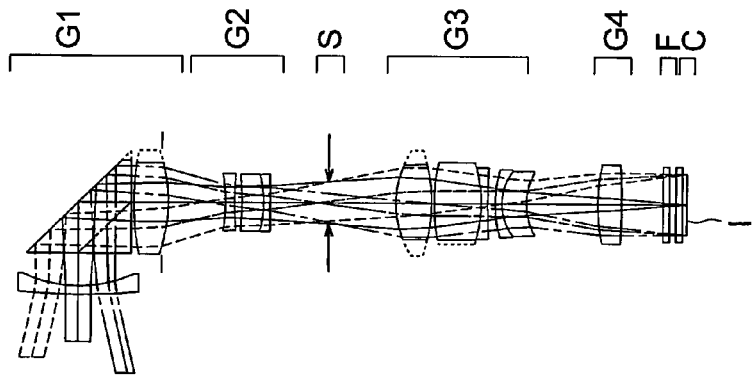
FIG. 1B is a cross-sectional view with an optical path, in an intermediate focal length state of the zoom lens in the image pickup apparatus according to the first embodiment.

FIG. 1A, FIG. 1B, and FIG. 2 show a cross-sectional view of a zoom lens with an optical path, according to a first embodiment based on the present invention.

FIG. 3A, FIG. 3B, FIG. 3C, and FIG. 3D (hereinafter, 'FIG. 3A to FIG. 3D'), FIG. 4A, FIG. 4B, FIG. 5A, FIG. 5B, FIG. 6A, FIG. 6B, FIG. 6C (hereinafter, 'FIG. 6A to FIG. 6C'), and FIG. 7A, FIG. 7B, and FIG. 7C (hereinafter, 'FIG. 7A to FIG. 7C') show an effective area and an outer shape of a typical lens according to the first embodiment.

Moreover, a plane which includes an incident-light axis and a reflected-light axis of a prism is let to be a plane of paper. The plane of paper is the direction of the short side of the image pickup element.

In the embodiments which will be described later, a first lens unit G1 corresponds to the object-side lens unit and a third lens unit G3 corresponds to the first zoom lens unit.

Moreover, as shown in the diagrams, an object-side sub lens unit of (in) a first lens unit G1 has a shape symmetrical about a plane of paper of FIG. 1A, FIG. 1B, and FIG. 2. A photographic apparatus in which, after reflected at the prism, an optical axis is directed to a lower side of the photographic apparatus will be described below.

FIG. 3A to FIG. 3D show cross-sectional views of the object-side sub lens unit in the first lens unit G1. The object-side sub lens unit is symmetric in a left-right (horizontal) direction of the photographic apparatus (refer to FIG. 12). Moreover, the shape is let to be asymmetric in a vertical direction of the photographic apparatus. In other words, FIG. 3A shows a cross-sectional view of the object-side sub lens unit on a plane parallel to the plane of paper as defined above. FIG. 3B shows a view of the object-side sub lens unit as seen from a side on which a light beam is incident. FIG. 3C shows a cross-sectional view on a plane perpendicular to the plane of paper including the optical axis of the object-side sub lens unit. FIG. 3D shows a view when the object-side sub lens unit is seen from a side from where, the light beam is output.

When a shorter one of an upward direction and a downward direction of the outer shape is let to be an upper side, it is advantageous for small-sizing in a direction of height of the photographic apparatus, and by separating a surface of the lens on a lower side from an effective surface, it is advantageous for reducing a ghost image.

When the shorter one is let to be the upper side, enough space in which the image-side lens unit in the first lens unit is to be disposed, can be imparted.

Moreover, an effective area of the object-side surface of the object-side sub lens unit is indicated by oblique lines. In both the vertical direction (upward and downward direction) and the horizontal direction (left-right direction), the shape is let to be almost symmetrical oval shape.

Figure 4A:
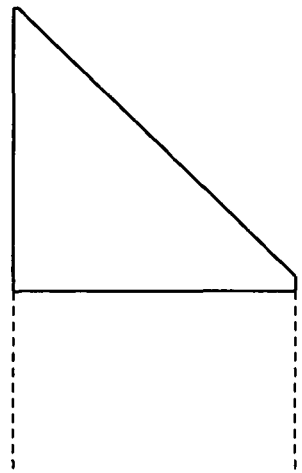
FIG. 4A and FIG. 4B are diagrams indicating an effective area and a shape of a prism in the first lens unit (the object-side lens unit) in the zoom lens in the image pickup apparatus according to the first embodiment.
Figure 4B:
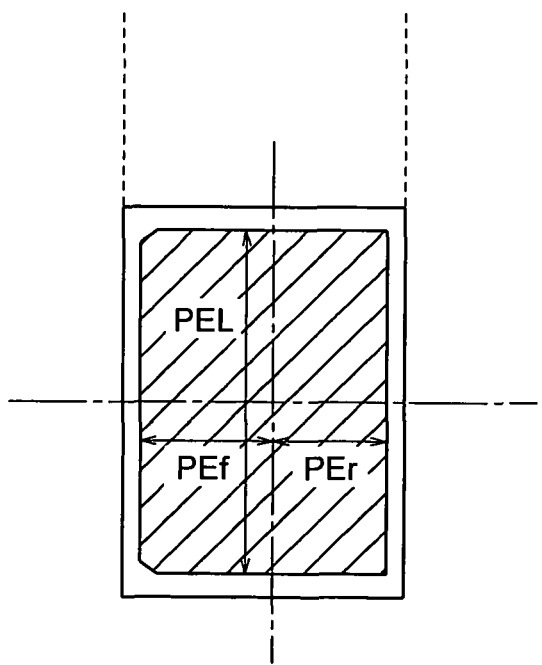

FIG. 4A shows a cross-sectional view of the prism in a plane parallel to the plane of paper. FIG. 4B shows a view when the prism is viewed from the image side of the image pickup apparatus. An outer shape of the prism, as shown in FIG. 4A, is a shape of which, a rear-surface side of an exit surface is cut.

In FIG. 4B, an effective area on the exit surface of the prism is shown by oblique lines. The effective area of the rear-surface side is smaller than the effective area of the front-surface side. Moreover, parameters PEL, PEf, and PEr in conditional expressions are shown collectively in the diagram.

As it has been described above, the size and (of) the effective area of the rear-surface side of the prism are determined to be such that a chief light ray of an off-axis light beam is not vignetted.

Figure 5A:
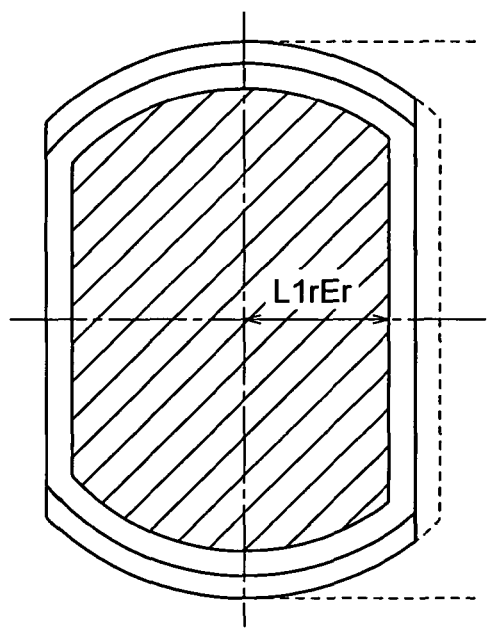
FIG. 5A and FIG. 5B are diagrams indicating an effective area and a shape of an image-side sub lens unit in the first lens unit (the object-side lens unit) in the zoom lens in the image pickup apparatus according to the first embodiment.
Figure 5B:
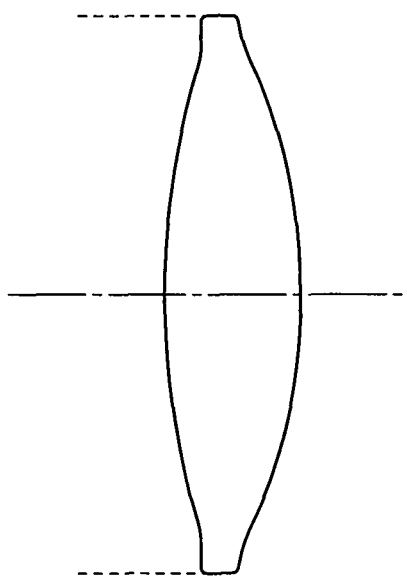

FIG. 5A shows a view when an image-side sub lens unit in the first lens unit G1 is seen from a side on which the light beam is incident. FIG. 5B shows a cross-sectional view on a surface perpendicular to the plane of paper including the optical axis of the image-side sub lens unit in the first lens group G1. An outer shape of the image-side sub lens unit, as shown in FIG. 5A, is a shape of which, a front-surface side and a rear-surface side which are bilaterally symmetric (symmetric in the horizontal direction) are partially cut. The manner in which, the front-surface side and the rear-surface side are cut, or in other words, when a circular shape is let to be a basic shape, a size of an area which is missing in the image-side sub lens unit as compared to the circular shape is such that the rear-surface side is larger than the front-surface side.

The size of the rear-surface side of the image-side sub lens unit is let to be almost same matching with the size of the prism. In FIG. 5A, an effective range on the object-side surface of the image-side sub lens unit is a range shown by oblique lines.

An effective area of the rear-surface side is smaller than an effective area of the front-surface side. Furthermore, parameter L1 r E in conditional expression is also shown collectively in the diagram.

A second lens unit G2 is not shown particularly in the diagram. The second lens unit G2 is a lens unit which can easily be made small. Therefore, the second lens unit G2 is let to have a shape such that the second lens unit G2 is not large at a front-surface side and a rear-surface side, than the first lens unit G1 and a third lens unit G3. It is preferable that an outer shape of the second lens unit G2 is either circular or oval.

An aperture stop S is a diaphragm having a circular-shaped aperture. An arrangement may be made such that an area of the aperture of the aperture stop is variable with the optical axis as a center. Moreover, the aperture stop S, without restricting to the circular shape, may be let to be elliptical-shaped elongated in a directed perpendicular to the plane of paper.

Figure 6A:
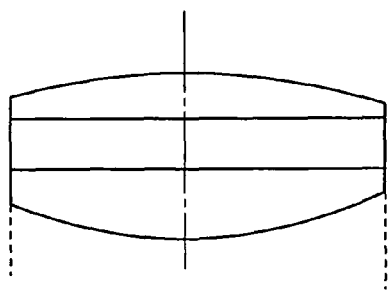
FIG. 6A, FIG. 6B, and FIG. 6C are diagrams indicating an effective area and a shape of an object-side lens in a third lens unit (a first zoom lens unit) in the zoom lens in the image pickup apparatus according to the first embodiment.
Figure 6B:
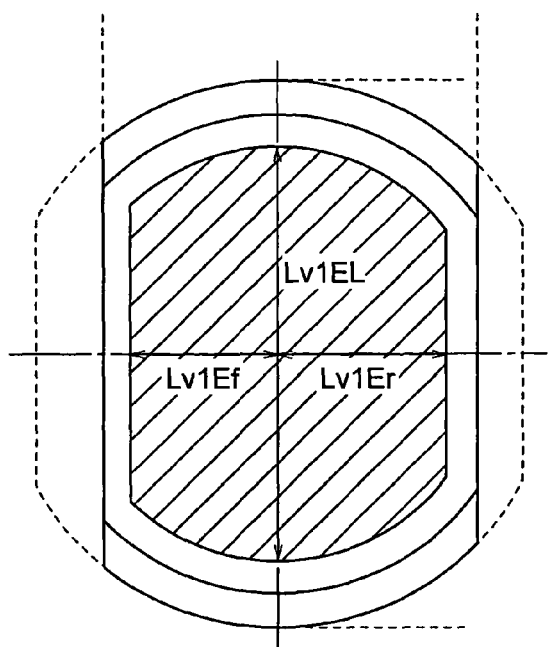
Figure 6C:
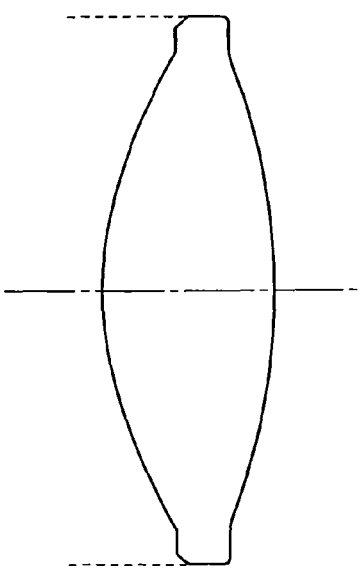

FIG. 6A shows a view (top view) as seen from a direction perpendicular to the plane of paper of an object-side lens in the third lens unit G3. FIG. 6B shows a view (front view) as seen from a side where a light beam is incident on the object-side lens. FIG. 6C shows a cross-sectional view (side view) on a surface perpendicular to the plane of paper including an optical axis of the object-side lens. The object-side lens has an outer shape of which, a front-surface side and a rear-surface side are partially cut. The manner in which, the front-surface side and the rear-surface side are missing is such that, the front-surface side is larger than the rear-surface side.

A length of the rear-surface side of the object-side lens is set to be somewhat smaller than the prism, taking into consideration that the third lens unit is a movable group, and based on a size of the rear-surface side of the image-side sub lens unit and the prism in the first lens unit.

In FIG. 6B, an effective area of the object-side surface of the object-side lens is shown by oblique lines. The effective area is smaller at the front-surface side than at the rear-surface side.

Moreover, it is not shown in the diagram but, other lenses in the third lens unit have a shape of which, a front-surface side and a rear-surface side are cut matching with the size of the object-side lens unit. In FIG. 6B, parameters Lv 1 Er, Lv 1 Ef, and Lv 1 EL in conditional expressions are shown collectively.

As members which determine an effective range, members such as a frame which holds a lens, a blacking in a portion around a lens surface, a diaphragm member having an aperture portion are conceivable. It is a common practice to determine the effective range by blacking, which also reduces cost.

Figure 7A:
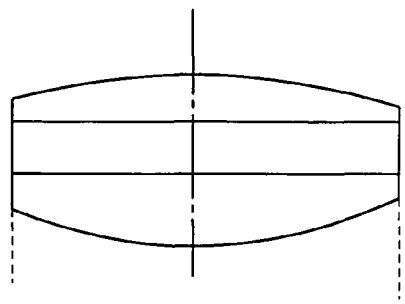
FIG. 7A, FIG. 7B, and FIG. 7C are diagrams indicating an effective area and a shape of a fourth lens unit in the zoom lens according to the image pickup apparatus according to the first embodiment.
Figure 7B:
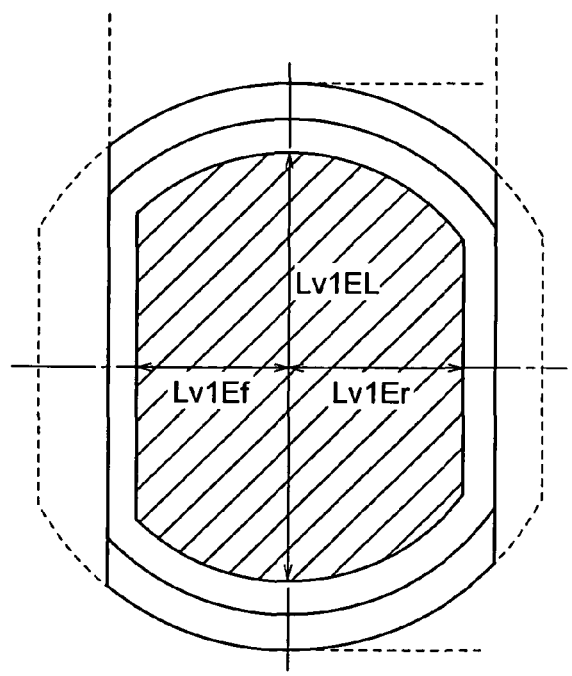
Figure 7C:
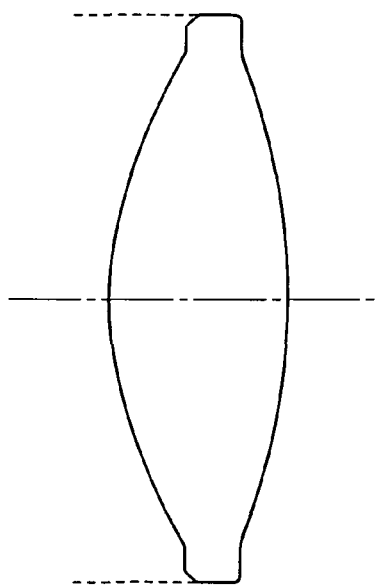

FIG. 7A shows a view (top view) as seen from a direction perpendicular to a plane of paper of a lens in a fourth lens unit G4. FIG. 7B shows a view (front view) as seen from a side where a light beam is incident on the lens in the fourth lens unit G4. FIG. 7C shows a cross-sectional view (side view) on a surface perpendicular to a plane of paper including an optical axis of the lens in the fourth lens unit G4.

The lens in the fourth lens unit G4, as shown in FIG. 7B, has a substantially rectangular outer shape. A side of a site (an upper end in the diagram) which has protruded in FIG. 7B (front view) is connected to a motor (not shown in the diagram) for carrying out focusing by moving the fourth lens unit G4.

Moreover, in FIG. 7B, an effective area of an object-side surface of the lens in the fourth lens unit G4 is indicated by oblique lines. Since the fourth lens unit G4 is disposed at a position near to the image pickup element, it is let to have a substantially rectangular shape which is close to the shape of the image pickup surface.

A first embodiment, a second embodiment, and a third embodiment of the zoom lens according to the present invention will be described below. Lens cross-sectional views at a wide angle end, in an intermediate focal length state, and at a telephoto end, at the time of infinite object point focusing are shown in FIG. 1A, FIG. 1B, and FIG. 2 respectively. In FIG. 1A, FIG. 1B, and FIG. 2, the first lens unit is denoted by G1, the second lens unit is denoted by G2, the aperture stop is denoted by S, the third lens unit is denoted by G3, the fourth lens unit is denoted by G4, a flat parallel plate which forms a low-pass filter on which, a wavelength-region restricting coating which restricts infrared light has been applied, is denoted by F, a flat parallel plate of a cover glass of an electronic image pickup element is denoted by C, and an image plane is denoted by I. A multilayer film for restricting wavelength region may be applied to a surface of the cover glass C. Moreover, an arrangement may be made such that a low-pass filter effect is imparted to the cover glass C.

Numerical data is data in a state when focused to an object at infinity. A unit of length of each numerical value is mm, and a unit of angle is ° (degree). Focusing in all the embodiments is to be carried out by a movement of a lens unit nearest to the image side.

A zoom lens according to the first embodiment, as shown in FIG. 1A, FIG. 1B, and FIG. 2, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from the wide angle end to the telephoto end, the first lens unit G1 is fixed, the second lens unit G2 moves toward an image side, the aperture stop S is fixed, and the third lens unit G3 moves toward the object side. Moreover, the fourth lens unit G4 moves for correction of a position of an image plane, and moves toward the object side at the time of focusing to an object at a close distance.

In order from the object side, the first lens unit G1 includes a negative meniscus lens having a convex surface directed toward the object side, an optical-path bending prism, and a biconvex positive lens. The second lens unit G2 includes a biconcave negative lens, and a cemented lens of a positive meniscus lens having a convex surface directed toward the image side and a biconcave negative lens. The third lens unit G3 includes a biconvex positive lens, a cemented lens of a biconvex positive lens and a biconcave negative lens, and a cemented lens of a negative meniscus lens having a concave surface directed toward the image side and a positive meniscus lens having a concave surface directed toward the image side. The fourth lens unit G4 includes a biconvex positive lens.

An aspheric surface is provided to eight surfaces namely, both surfaces of the biconvex positive lens in the first lens unit G1, both surfaces of the biconcave negative lens in the second lens unit G2, both surfaces of the biconvex positive lens on the object side in the third lens unit G3, and both surfaces of the biconvex positive lens in the fourth lens group G4.

Moreover, even in the second embodiment, the third embodiment, and examples thereof, an outer shape of each lens being almost same as in FIG. 4A, FIG. 4B, FIG. 5A, FIG. 5B, FIG. 6A to FIG. 6C, FIG. 7A to FIG. 7C, FIG. 8A, and FIG. 8B, only lens cross-sectional views are shown, and numerical values related to the present invention are indicated in tables.

Figure 8B:
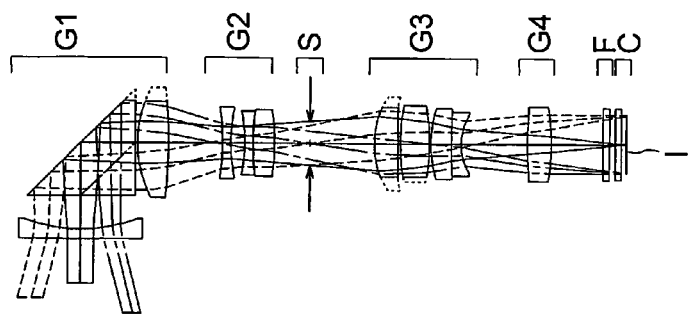
FIG. 8B is a cross-sectional view with an optical path, at an intermediate focal length state of the zoom lens in the image pickup apparatus according to the second embodiment.
Figure 8A:
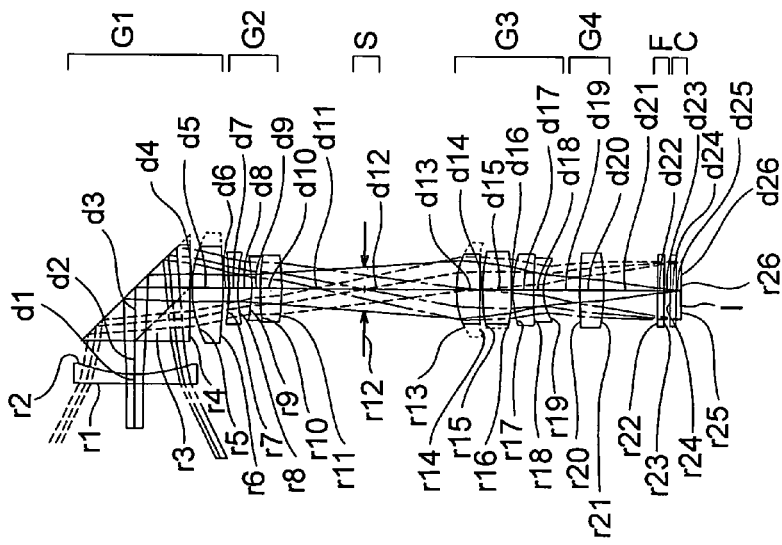
FIG. 8A is a cross-sectional view with an optical path, at a wide angle end of a zoom lens in an image pickup apparatus according to a second embodiment.
Figure 9:
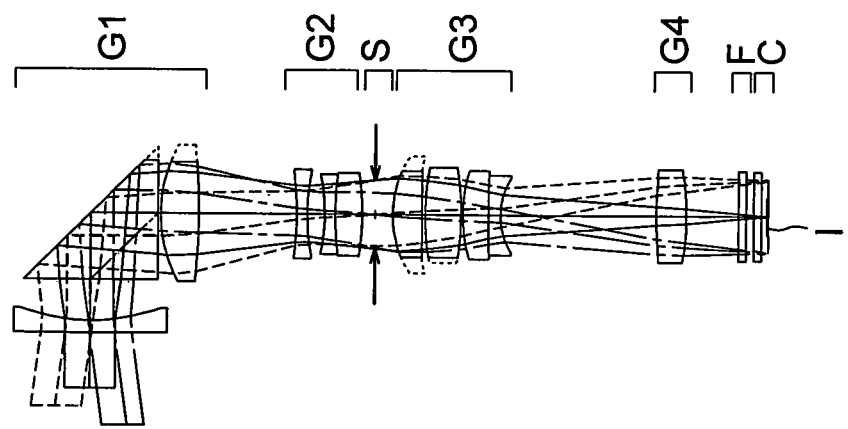
FIG. 9 is a cross-sectional view with an optical path, at a telephoto end of the zoom lens in the image pickup apparatus according to the second embodiment.

A zoom lens according to the second embodiment, as shown in FIG. 8A, FIG. 8B, and FIG. 9, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from the wide angle end to the telephoto end, the first lens unit G1 is fixed, the second lens unit G2 moves toward an image side, the aperture stop S is fixed, and the third lens unit G3 moves toward the object side. Moreover, the fourth lens unit G4 moves for correction of a position of an image plane, and moves toward the object side at the time of focusing to an object at a close distance.

In order from the object side, the first lens unit G1 includes a negative meniscus lens having a convex surface directed toward the object side, an optical-path bending prism, and a biconvex positive lens. The second lens unit G2 includes a biconcave negative lens, and a cemented lens of a biconcave negative lens and a biconvex positive lens. The third lens unit G3 includes a biconvex positive lens, a biconvex positive lens, a positive meniscus lens having a concave surface directed toward the image side, and a negative meniscus lens having a concave surface directed toward the image side. The fourth lens unit G4 includes a biconvex positive lens.

An aspheric surface is provided to seven surfaces namely, a surface on the image side of the negative meniscus lens and both surfaces of the biconvex positive lens in the first lens unit G1, both surfaces of the biconvex positive lens on the object side in the third lens unit G2, and both surfaces of the biconvex positive lens in the fourth lens unit G4.

Figure 10B:
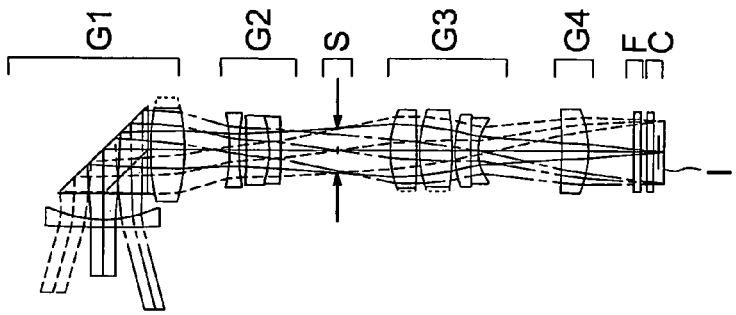
FIG. 10B is a cross-sectional view with an optical path, at an intermediate focal length state of the zoom lens in the image pickup apparatus according to the third embodiment.
Figure 10A:
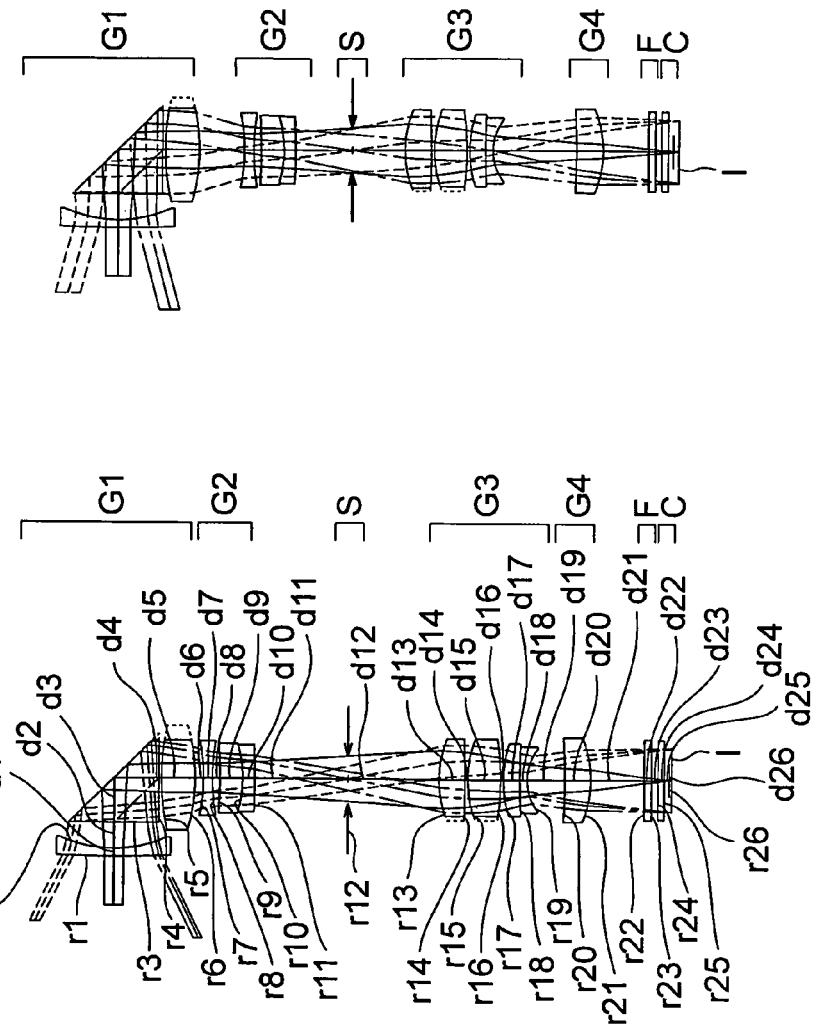
FIG. 10A is a cross-sectional view with an optical path, at a wide angle end of a zoom lens in an image pickup apparatus according to a third embodiment.
Figure 11:
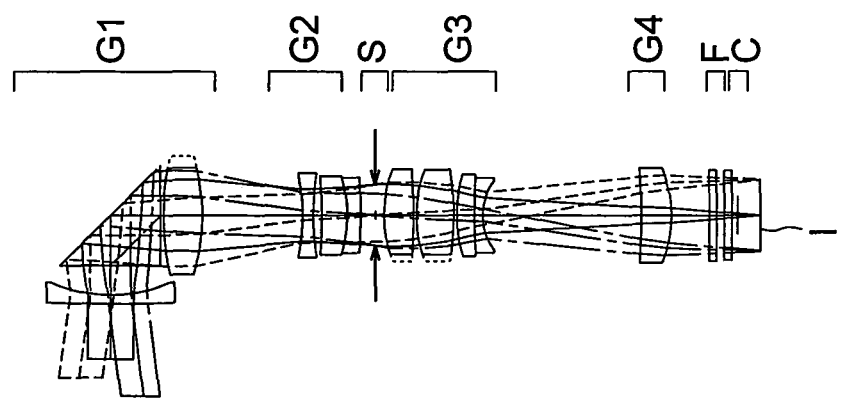
FIG. 11 is a cross-sectional view with an optical path, at a telephoto end of the zoom lens in the image pickup apparatus according to the third embodiment.

A zoom lens according to the third embodiment, as shown in FIG. 10A, FIG. 10B, and FIG. 11, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from the wide angle end to the telephoto end, the first lens unit G1 is fixed, the second lens unit G2 moves toward an image side, the aperture stop S is fixed, and the third lens unit G3 moves toward the object side. Moreover, the fourth lens unit G4 moves for correction of a position of an image plane, and moves toward the object side at the time of focusing to an object at a close distance.

In order from the object side, the first lens unit G1 includes a negative meniscus lens having a convex surface directed toward the object side, an optical-path bending prism, and a biconvex positive lens. The second lens unit G2 includes a biconcave negative lens, and a cemented lens of a positive meniscus lens having a convex surface directed toward the image side and a negative meniscus lens having a convex surface directed toward the image side. The third lens unit G3 includes a biconvex positive lens, a biconvex positive lens, and a cemented lens of a positive meniscus lens having a concave surface directed toward the image side and a negative meniscus lens having a concave surface directed toward the image side. The fourth lens unit G4 includes a positive meniscus lens having a convex surface directed toward the image side.

An aspheric surface is provided to seven surfaces namely, a surface on the image side of the negative meniscus lens and both surfaces of the biconvex positive lens in the first lens unit G1, both surfaces of the biconvex positive lens on the object side in the third lens unit G3, and both surfaces of the biconvex positive lens in the fourth lens unit G4.

Numerical data of each embodiment described above is shown below. Apart from symbols described above, FL denotes a focal length of the entire zoom lens system, $F_{NO}$ denotes an F number, ω denotes a half angle of field, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. Further, * denotes an aspheric data.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)_2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively.

Moreover, in the aspherical surface coefficients, 'e–n' (where, n is an integral number) indicates '$10^{-n}$'.

EXAMPLE 1

| Unit mm Surface data | | | | |
|---|---|---|---|---|
| Surface no. | r | d | nd | vd |
| Object plane | ∞ | ∞ | | |
| 1 | 45.3665 | 0.7 | 2.00069 | 25.46 |
| 2 | 10.2107 | 2.62 | | |
| 3 | ∞ | 8.15 | 1.84666 | 23.78 |
| 4 | ∞ | 0.2 | | |
| 5* | 18.133 | 2.7472 | 1.6935 | 53.21 |
| 6* | −12.3279 | −0.5 | | |
| 7 | ∞ | Variable | | |
| 8* | −13.0437 | 0.7 | 1.8061 | 40.92 |
| 9* | 27.0694 | 0.61 | | |
| 10 | −25.2804 | 1.72 | 1.92286 | 20.88 |
| 11 | −8.3108 | 0.4773 | 1.816 | 46.62 |
| 12 | 4.54E+04 | Variable | | |
| 13 (stop) | ∞ | Variable | | |
| 14* | 7.1238 | 2.8248 | 1.497 | 81.54 |
| 15* | −12.1151 | 0.2 | | |
| 16 | 15.0222 | 3.6788 | 1.497 | 81.54 |
| 17 | −11.0558 | 0.5 | 1.72916 | 54.68 |
| 18 | 39.8058 | 0.5908 | | |
| 19 | 9.6808 | 0.5 | 2.00069 | 25.46 |
| 20 | 4.1507 | 1.96 | 1.58913 | 61.14 |
| 21 | 5.15 | Variable | | |
| 22* | 13.6247 | 1.8884 | 1.53071 | 55.6 |
| 23* | −58.9893 | Variable | | |
| 24 | ∞ | 0.5 | 1.51633 | 64.14 |
| 25 | ∞ | 0.5 | | |
| 26 | ∞ | 0.5 | 1.51633 | 64.14 |
| 27 | ∞ | 0.37 | | |
| 28 | Image plane ∞ | (Variable) | | |

(Light receiving surface)
(paraxial image plane)

| Aspherical surface data |
|---|
| 5th surface |

K = 0
A4 = −1.2216E−05, A6 = −2.3441E−07, A8 = −4.0688E−08,
A10 = −2.9950E−11
6th surface K = 0.1399
A4 = 1.4627E−04, A6 = −6.2795E−07, A8 = −2.0350E−08,
A10 = −1.5266E−10
8th surface K = 0
A4 = −1.8897E−04, A6 = −6.1814E−06, A8 = 1.8227E−06,
A10 = −9.1120E−08
9th surface K = 0
A4 = −4.3016E−04, A6 = 4.3846E−06, A8 = 1.4370E−06,
A10 = −1.2267E−07
14th surface

K = 0
A4 = −4.8642E−04, A6 = 7.9384E−07, A8 = −4.6316E−08,
A10 = −8.6511E−10

-continued

15th surface

K = 0
A4 = 1.9041E−04, A6 = 2.2176E−06, A8 = 1.4931E−08,
A10 = 0.0000E+00
22nd surface K = 0
A4 = 8.4070E−05, A6 = 1.5676E−05, A8 = −3.9243E−06,
A10 = 1.4920E−07
23rd surface

K = 0
A4 = 2.4046E−04, A6 = −3.0261E−06, A8 = −3.5165E−06,
A10 = 1.5194E−07

Zoom data

| | Wide angle | Intermediate | Telephoto |
|---|---|---|---|
| ω | 41.2 | 18.8 | 8.6 |
| Fno | 4 | 5.42 | 5.98 |
| FL | 5.13 | 10.69 | 24.41 |
| d7 | 1.07 | 5.01718 | 8.11085 |
| d12 | 7.81576 | 3.87953 | 0.79274 |
| d13 | 9.32878 | 6.01909 | 0.79154 |
| d21 | 2.40651 | 5.56161 | 10.37915 |
| d23 | 3.08094 | 3.23394 | 3.64518 |
| (d28 | −0.00005 | −0.00007 | −0.00019) |

A lens cross-sectional view in the first embodiment is let to be same, and as numerical values related to an effective size etc. in conditional expressions, two examples are cited in the following table as example 1-1 and example 1-2.

| | Example 1-1 | Example 1-2 |
|---|---|---|
| IHs | 2.42 | 2.42 |
| Lv1Ef | 2.60 | 3.30 |
| Lv1Er | 2.70 | 3.40 |
| Lv1EL | 7.40 | 7.40 |
| L1rEr | 3.00 | 3.60 |
| Pem | 2.90 | 2.90 |
| PEr | 2.90 | 3.50 |
| PEf | 3.58 | 3.58 |
| Pe0 | 2.25 | 1.96 |
| Pec | 2.62 | 2.62 |
| PEL | 10.40 | 10.40 |
| fW | 5.13 | 5.13 |
| fT | 24.41 | 24.41 |
| Lv1Er/Lv1EL | 0.365 | 0.459 |
| Lv1Ef/IHs | 1.074 | 1.364 |
| Lv1Ef/Lv1Er | 0.963 | 0.971 |
| L1rEr/PEr | 1.03 | 1.03 |
| Lv1Er/PEr | 0.931 | 0.971 |
| fT/fW | 4.76 | 4.76 |
| EVc-f | −1.7 | −1.2 |

EXAMPLE 2

Unit mm
Surface data

| Surface no. | r | d | nd | vd |
|---|---|---|---|---|
| Object plane | ∞ | ∞ | | |
| 1 | 494.305 | 0.8 | 2.00069 | 25.46 |
| 2* | 11.811 | 2.81 | | |
| 3 | ∞ | 9 | 1.834 | 37.16 |
| 4 | ∞ | 0.2 | | |
| 5* | 9.368 | 2.55 | 1.713 | 53.87 |
| 6* | −40.214 | Variable | | |
| 7 | −22.842 | 0.7 | 1.883 | 40.76 |
| 8 | 14.261 | 1.15 | | |
| 9 | −13.699 | 0.7 | 1.883 | 40.76 |
| 10 | 20.441 | 1.8 | 1.92286 | 20.88 |
| 11 | −20.24 | Variable | | |
| 12 | ∞ | Variable | | |
| 13* | 7.979 | 1.95 | 1.61772 | 49.81 |
| 14* | −66.841 | 0.2 | | |
| 15 | 15.96 | 2.43 | 1.497 | 81.54 |
| 16 | −18.074 | 0.1 | | |
| 17 | 10.141 | 1.73 | 1.48749 | 70.23 |
| 18 | 60.508 | 0.8 | 1.92286 | 20.88 |
| 19 | 4.794 | Variable | | |
| 20* | 20.078 | 2 | 1.497 | 81.54 |
| 21* | −32.393 | Variable | | |
| 22 | ∞ | 0.5 | 1.51633 | 64.14 |
| 23 | ∞ | 0.5 | | |
| 24 | ∞ | 0.5 | 1.51633 | 64.14 |
| 25 | ∞ | 0.37 | | |
| 26 Image plane | ∞ | (Variable) | | |

(Light receiving surface)
(paraxial image plane)

Aspherical surface data

2nd surface

K = 0
A4 = −2.7364E−04, A6 = 1.4504E−06, A8 = −1.8043E−08,
A10 = 1.0118E−11
5th surface K = 0
A4 = −1.6610E−04, A6 = −2.1998E−06, A8 = 3.7691E−08,
A10 = 8.0754E−10
6th surface K = 0
A4 = 9.0942E−05, A6 = −2.7554E−06, A8 = 8.6822E−08,
A10 = 2.9636E−10
13th surface K = 0
A4 = 1.4635E−04, A6 = 1.3240E−06, A8 = 1.8472E−06,
A10 = −1.6558E−08
14th surface K = 0
A4 = 7.3575E−04, A6 = 4.9561E−06, A8 = 2.2287E−06,
A10 = 0.0000E+00
20th surface K = 0
A4 = −1.1206E−03, A6 = 0.0000E+00, A8 = 0.0000E+00,
A10 = 0.0000E+00
21st surface

K = 0
A4 = −1.1206E−03, A6 = 1.9313E−06, A8 = 1.1559E−06,
A10 = −2.5715E−08

Zoom data

| | Wide angle | Intermediate | Telephoto |
|---|---|---|---|
| ω | 39.1 | 20.9 | 11.6 |
| Fno | 3.57 | 4.37 | 5.09 |
| FL | 5.07 | 9.37 | 17.43 |
| d6 | 0.5 | 4.47 | 6.59 |
| d11 | 6.93 | 2.96 | 0.84 |
| d12 | 7.68 | 5.39 | 1.16 |
| d19 | 3 | 5.51 | 10.48 |
| d21 | 4.47 | 4.25 | 3.5 |
| (d26 | 0.03646 | 0.04818 | 0.0876) |

A lens cross-sectional view in the second embodiment is let to be same, and as numerical values related to an effective size etc. in conditional expressions, two examples are cited in the following table as example 2-1 and example 2-2.

|  | Example 2-1 | Example 2-2 |
|---|---|---|
| IHs | 2.42 | 2.42 |
| Lv1Ef | 2.45 | 2.45 |
| Lv1Er | 2.65 | 2.65 |
| Lv1EL | 6.90 | 6.90 |
| L1rEr | 3.40 | 3.40 |
| PEm | 3.30 | 3.30 |
| PEr | 3.30 | 3.60 |
| PEf | 4.00 | 4.00 |
| Pe0 | 2.07 | 2.07 |
| Pec | 2.55 | 2.55 |
| PEL | 11.00 | 11.00 |
| fW | 5.07 | 5.07 |
| fT | 17.43 | 17.43 |
| Lv1Er/Lv1EL | 0.384 | 0.384 |
| Lv1Ef/IHs | 1.012 | 1.012 |
| Lv1Ef/Lv1Er | 0.925 | 0.925 |
| L1rEr/PEr | 1.03 | 0.94 |
| Lv1Er/PEr | 0.803 | 0.736 |
| fT/fW | 3.44 | 3.44 |
| EVc-fv | −0.8 | −0.8 |

EXAMPLE 3

Unit mm
Surface data

| Surface no. | r | d | nd | vd |
|---|---|---|---|---|
| Object plane | ∞ | ∞ | | |
| 1 | 101.058 | 0.6 | 2.00069 | 25.46 |
| 2* | 9.8 | 2 | | |
| 3 | ∞ | 7.8 | 1.84666 | 23.78 |
| 4 | ∞ | 0.2 | | |
| 5* | 16.913 | 2.5918 | 1.76802 | 49.24 |
| 6* | −14.0938 | Variable | | |
| 7 | −16.3299 | 0.7 | 1.77377 | 47.17 |
| 8 | 13.9182 | 0.5637 | | |
| 9 | −45.156 | 1.7 | 1.92286 | 20.88 |
| 10 | −9.7361 | 0.8923 | 1.883 | 40.76 |
| 11 | −61.2033 | Variable | | |
| 12 | ∞ | Variable | | |
| 13* | 7.922 | 1.9956 | 1.58313 | 59.38 |
| 14* | −39.4331 | 0.2 | | |
| 15 | 8.5926 | 2.5 | 1.497 | 81.54 |
| 16 | −20.3394 | 0.2 | | |
| 17 | 8.7662 | 1.2 | 1.51742 | 52.43 |
| 18 | 36.4003 | 0.5781 | 2.00069 | 25.46 |
| 19 | 3.9484 | Variable | | |
| 20* | −42.8587 | 2 | 1.5311 | 55.91 |
| 21* | −8.0127 | Variable | | |
| 22 | ∞ | 0.5 | 1.51633 | 64.14 |
| 23 | ∞ | 0.5 | | |
| 24 | ∞ | 0.5 | 1.51633 | 64.14 |
| 25 | ∞ | 0.37 | | |
| 26 | Image plane ∞ | (Variable) | | |

(Light receiving surface)
(paraxial image plane)

Aspherical surface data

5th surface

K = 0
A4 = 1.0255E−05, A6 = −2.9963E−06, A8 = 1.5670E−07,
A10 = −3.2823E−09

-continued

6th surface

K = 0
A4 = 1.3596E−04, A6 = −3.2171E−06, A8 = 1.5396E−07,
A10 = −3.1268E−09

7th surface

K = 0
A4 = −3.3996E−04, A6 = 1.0901E−05, A8 = −6.3662E−07,
A10 = 2.9087E−08

8th surface

K = 0
A4 = −6.1175E−04, A6 = 1.8130E−05, A8 = −2.4649E−06,
A10 = 1.2234E−07

13th surface

K = 0
A4 = −1.4085E−04, A6 = −6.0043E−06, A8 = 3.8385E−07,
A10 = −1.4605E−08

14th surface

K = 0
A4 = 5.0254E−04, A6 = −1.7048E−06, A8 = 3.0575E−07,
A10 = −1.2763E−08

20th surface

K = −51.0253
A4 = 1.3159E−04, A6 = 3.9588E−05, A8 = −3.9795E−06,
A10 = 0.0000E+00

21st surface

K = 0
A4 = 6.0395E−04, A6 = 2.9117E−05, A8 = −3.8238E−06,
A10 = 2.3728E−08

Zoom data

|  | Wide angle | Intermediate | Telephoto |
|---|---|---|---|
| ω | 40.6 | 23.3 | 12.2 |
| Fno | 3.6 | 4.8 | 5.7 |
| FL | 5.07 | 8.78 | 17.5 |
| d6 | 0.6 | 3.36253 | 6.65076 |
| d11 | 7.0529 | 4.28987 | 1 |
| d12 | 6.88865 | 4.00794 | 0.6 |
| d19 | 2.78614 | 6.27688 | 10.65344 |
| d21 | 4.07164 | 3.46222 | 2.49522 |
| (d26 | 0.04424 | 0.0305 | 0.06359) |

|  | Example3 |
|---|---|
| IHs | 2.42 |
| Lv1Ef | 2.42 |
| Lv1Er | 2.50 |
| Lv1EL | 8.60 |
| L1rEr | 3.00 |
| PEm | 2.90 |
| PEr | 3.00 |
| PEf | 3.40 |
| Pe0 | 1.87 |
| Pec | 2.42 |
| PEL | 9.60 |
| fW | 5.07 |
| fT | 17.50 |
| Lv1Er/Lv1EL | 0.291 |
| Lv1Ef/IHs | 1.000 |
| Lv1Ef/Lv1Er | 0.968 |
| L1rEr/PEr | 1.00 |
| Lv1Er/PEr | 0.833 |
| fT/fW | 3.45 |
| EVc-f | −1.1 |

Next, data of degradation of amount of light in each example is shown below.

Here, EVf is indicated as an EV value in which, a drop in amount of light at the maximum image height on the front-surface side (an image position at a lower end of the object) is compared with (an amount of light at) a center of the image, and EVr is indicated as an EV value in which, a drop in amount of light at the maximum image height on the rear-surface side (an image position at an upper end of the object) is compared with (an amount of light at) a center of the image.

EXAMPLE 1-1

|  | EVf | EVr | EVr − EVf |
|---|---|---|---|
| Amount of light at wide angle end | −1.7 | −1.6 | 0.1 |
| Amount of light at intermediate focal length | −0.5 | −0.2 | 0.3 |
| Amount of light at telephoto end | −0.4 | −0.2 | 0.2 |

EXAMPLE 1-2

|  | EVf | EVr | EVr − EVf |
|---|---|---|---|
| Amount of light at wide angle end | −1.2 | −1.1 | 0.1 |
| Amount of light at intermediate focal length | −0.2 | −0.2 | 0.0 |
| Amount of light at telephoto end | −0.2 | −0.2 | 0.0 |

EXAMPLE 2-1

|  | EVf | EVr | EVr − EVf |
|---|---|---|---|
| Amount of light at wide angle end | −0.8 | −0.7 | 0.1 |
| Amount of light at intermediate focal length | −0.6 | −0.2 | 0.4 |
| Amount of light at telephoto end | −0.3 | −0.1 | 0.2 |

EXAMPLE 2-2

|  | EVf | EVr | EVr − EVf |
|---|---|---|---|
| Amount of light at wide angle end | −0.8 | −0.7 | 0.1 |
| Amount of light at intermediate focal length | −0.5 | −0.2 | 0.3 |
| Amount of light at telephoto end | −0.3 | −0.1 | 0.2 |

EXAMPLE 3

|  | EVf | EVr | EVr − EVf |
|---|---|---|---|
| Amount of light at wide angle end | −1.1 | −1.1 | 0.0 |
| Amount of light at intermediate focal length | −0.4 | −0.2 | 0.2 |
| Amount of light at telephoto end | −0.3 | −0.2 | 0.1 |

(Digital Camera)

An image of an object is formed by the zoom lens described above, and the image which has been formed can be used in an electronic photographic apparatus such as a digital camera and a video camera, which captures the image by receiving (light) on an electronic image pickup element such as a CCD (charge coupled device). Embodiments of such electronic photographic apparatus will be described below.

Figure 12:
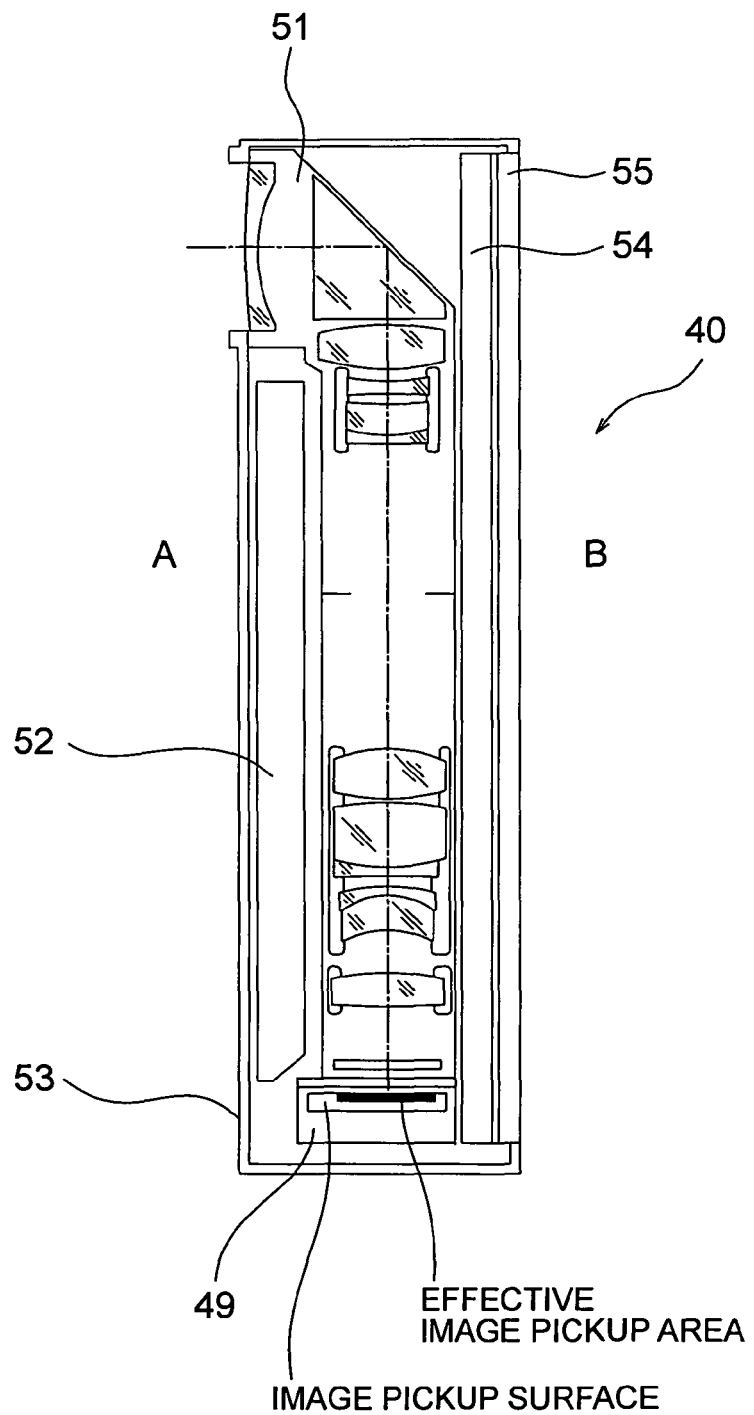
FIG. 12 is a schematic cross-sectional structural view of an image pickup apparatus.

FIG. 12 is a schematic cross-sectional structural view of a digital camera 40 which is a photographic apparatus including a zoom lens of an optical path reflecting type according to the abovementioned embodiments.

Here, a structure in which, the zoom lens according to the first embodiment has been used will be described. Each lens unit in the zoom lens is held by a holding frame, and the frames holding the zoom lenses are accommodated to be integrated in a lens-frame unit 51.

An image pickup element 49 is disposed such that a center of an image pickup surface is shifted toward a front-surface A side of the camera, and a center of an optical axis of the zoom lens is disposed to be shifted (misaligned) from the center of the image pickup surface.

A damper 52 for absorbing an impact from outside (an external impact) is provided on the front-surface A side of the lens-frame unit 51, to be spread over the lens units from the second lens unit up to the fourth lens unit. A front plate 53 is disposed on the front-surface side of the damper 52.

A liquid crystal display element 54 which is spread from the first lens unit up to a rear-surface side of the image pickup element, and a cover glass 55 which covers the liquid crystal display element 54 are disposed on a rear-surface B side of the lens frame unit 51.

Figure 13B:
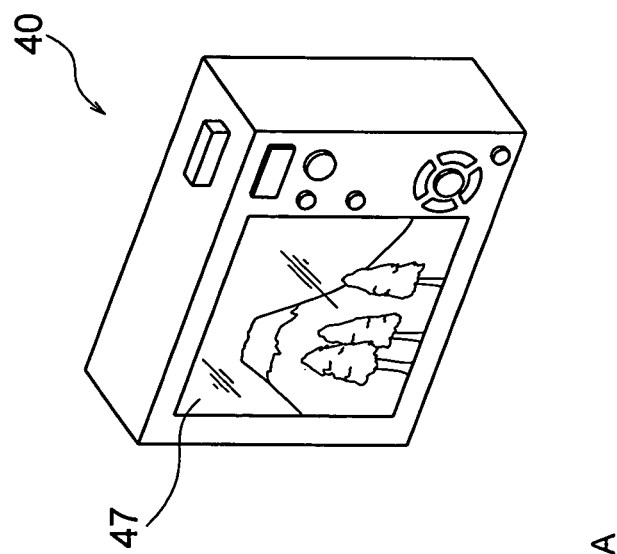
FIG. 13A and FIG. 13B are diagrams showing an outward appearance of the image pickup apparatus.
Figure 13A:
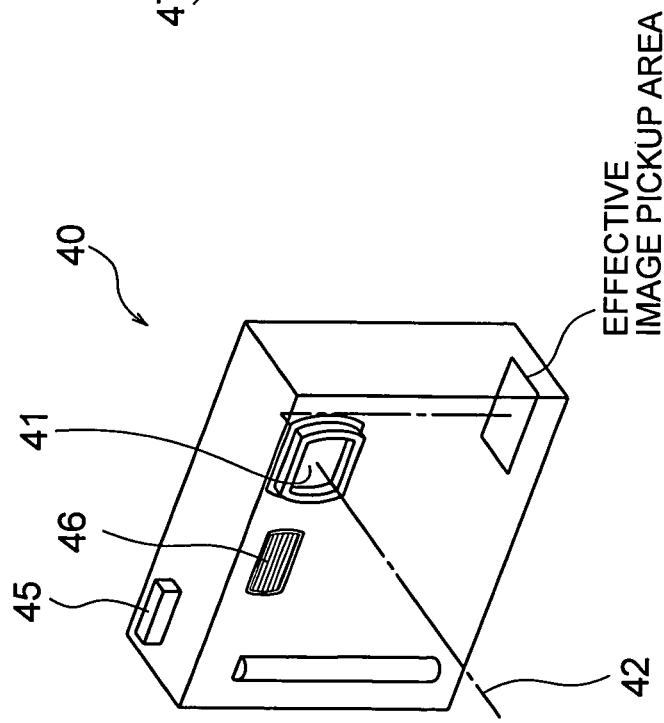

FIG. 13A is a front perspective view showing an outward appearance of the digital camera 40, and FIG. 13B is a rear perspective view showing the outward appearance of the digital camera 40. The digital camera 40, in a case of this example, includes a photographic (taking) optical system 41, a shutter button 45, a flash 46, and a liquid crystal display monitor 47, and when the shutter button 45 which is disposed at an upper portion of the digital camera 40 is pressed, an image is captured in conjunction with the pressing, through the photographic optical system 41 such as the optical-path bending zoom lens according to the first embodiment. An image of an object which is formed by the photographic optical system 41 is formed on an image pickup surface of a CCD 149 (FIG. 14) via a near-infrared cut filter and an optical low-pass filter. The image of the object which has been received by the CCD 149 is displayed as an electronic image on the liquid crystal display monitor 47 provided on a rear surface of the digital camera 40 via a processing unit. Moreover, a recording unit is connected to the processing unit, and it is also possible to record the electronic image which has been captured. The recording unit may be provided separately from the processing unit, and arrangement may be made to record by writing electronically in a medium such as a flexible disc, a memory card, and an MO. Moreover, the camera may be structured as a silver salt camera in which a silver salt film is disposed instead of the CCD 149.

The digital camera 40 structured in such manner has the photographic optical system 41 with a high zoom ratio, and a zoom lens having a superior optical performance. Therefore, it is possible to realize a low-cost and extremely thin digital camera with a superior performance.

(Internal Circuit Structure)

Figure 14:
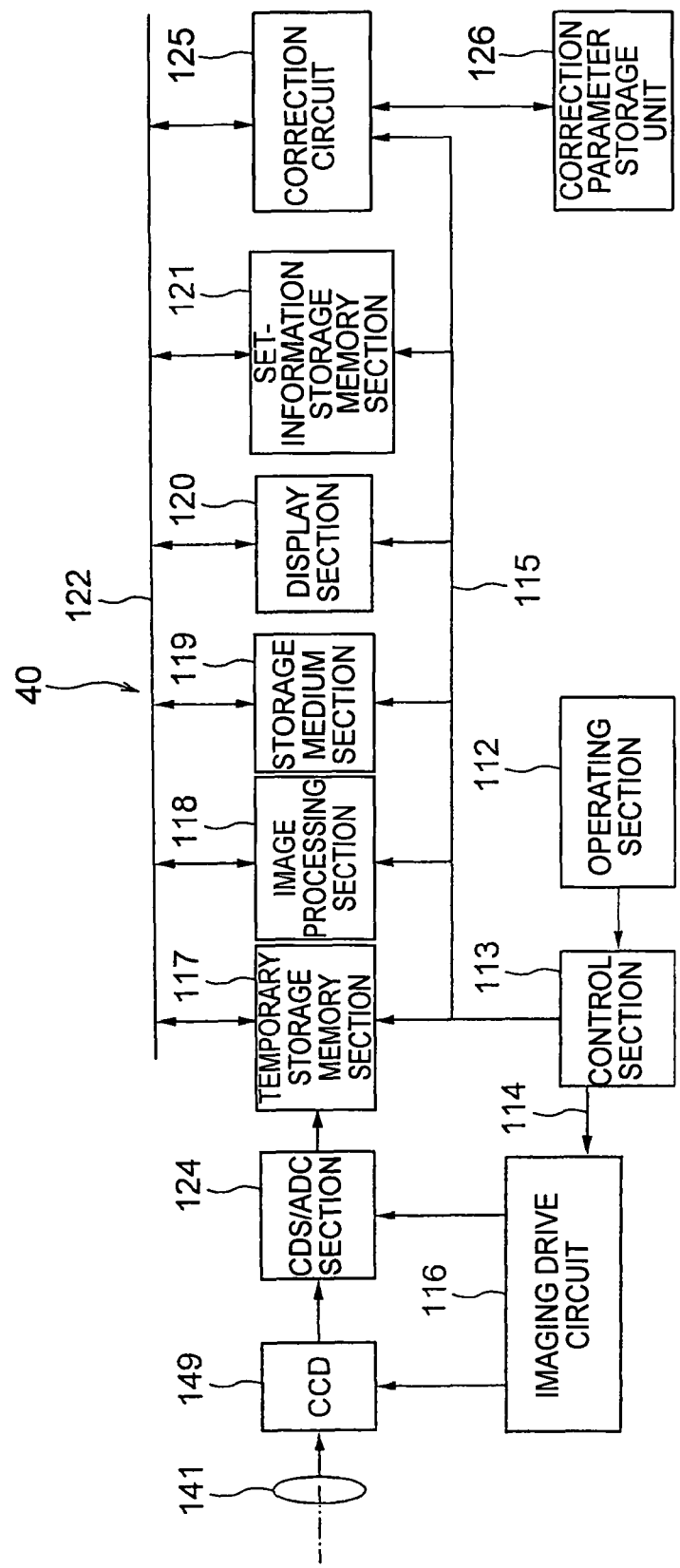
FIG. 14 is a circuit diagram of the image pickup apparatus.

FIG. 14 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 14, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

The digital camera 140 includes a correction circuit 125 (corresponds to a shading correction section, a distortion correction section, and a noise correction section which will be described later) which corrects electronically an image picked up by the image pickup element (CCD) 149.

The correction circuit 125, in order to correct a decreasing rate of asymmetric brightness on a front side (front-surface side) and a rear side (rear-surface side) of the zoom lens, has a correction parameter storage unit 126 (corresponds to a shading correction parameter storage section and a shading correction parameter calculating section) which stores parameters of (for) brightness correction, which differ at a front-surface side and a rear-surface side of the center of the image.

Accordingly, it is possible to correct an exposure difference on the front-surface side and the rear-surface side which occurs due to vignetting of a light beam, and to achieve a favorable image.

Furthermore, the correction parameter storage section 126, upon taking into account an asymmetric exposure difference which changes according to a change in the area of the aperture of the aperture stop and zooming of the zoom lens, holds correction parameter which differs on the front-surface side and the rear-surface side corresponding to the respective state.

Accordingly, it is possible to make correction according to the asymmetric exposure difference which changes according to the state of the zoom lens, and therefore it is preferable.

Apart from this, in order to correct an asymmetric image change which occurs due to an asymmetric vignetting, it is preferable to correct an asymmetric noise at the time of shading correction and a difference in a depth of field in a surrounding portion due to the image processing.

Moreover, it is preferable to carry out correction in view of vignetting corresponding to the photometric area and the focusing area.

Moreover, an arrangement may be made such that, the image processing is carried out in advance to reduce an effect of asymmetry of vignetting, and thereafter, an image conversion of (for) a filter effect by the image processing is carried out.

As a method of generating a shading correction parameter, a method in which, a shading distribution which occurs due to an effect of brightness on a flat surface of a uniform white color is subjected to an inverse operation, and stored as a correction parameter, can be used.

For instance, in a case of letting a reciprocal of a ratio of luminance of a corresponding pixel corresponding to brightness of the center of the image captured to be a correction parameter, when for brightness corresponding to a pixel at the center of the image captured, when the brightness is ½ in an arbitrary pixel A (difference with the center is −1 EV) and the brightness is ¼ in an arbitrary pixel B (difference with the center is −2 EV), the correction parameter becomes 1 (+0 EV) at the center, 2 (+1 EV) for the pixel A, and 4 (+2 EV) for the pixel B.

Moreover, by multiplying a value of brightness of each pixel by the correction parameter corresponding to each pixel, it is possible to carry out the shading correction with high accuracy.

With the brightness effecting a flat surface of red (R), green (G), and blue (B), when a correction parameter which corrects a shading tendency of each color component of the image pickup element is generated, it is possible to carry out correction of color shading with a high accuracy.

Various variations of a correction operation and a manner of calculating the shading correction parameter are possible.

For instance, for correcting asymmetric shading, the number of parameters becomes large. Therefore, when a correction parameter table for various states of the zoom lens is stored, a storage capacity of storing the correction parameters becomes excessive.

Therefore, the shading correction parameters are to be split into three or more types, and a correction parameter in certain photographic state is to be found by an operation such as multiplication and summing. Accordingly, it is possible to reduce a capacity of a memory, and therefore it is preferable.

For instance, the parameters are to be stored upon dividing into parameters which are rotationally symmetric (parameters which depend on the image height) and parameters which are non-rotationally symmetric (parameters which depend on a position in the direction of a short side of the image pickup surface and parameters which depend on a position in the direction of a long side). An arrangement may be made such that, a correction parameter of each pixel is calculated by addition or multiplication of respective parameter data.

Moreover, for correcting electrically the shading tendency which changes according to the focal length, the F number, and the focusing state of the zoom lens, a correction-parameter distribution corresponding to a limited plurality of states (or the distribution is a correction parameter which can be subjected to operation) is to be stored.

Furthermore, an arrangement may be made such that the correction parameter in an arbitrary state is calculated by interpolation of the plurality of parameter distributions from among the parameter distributions which have been stored or operated.

Moreover, when the asymmetric shading is corrected electrically, there is an occurrence of a noise of asymmetric distribution. Therefore, an arrangement may be made such that an asymmetric noise correction parameter is imparted, and the noise which occurs asymmetrically is also corrected.

Moreover, it is also possible to enjoy photography in which full use of shading is made. For example, a switch for switching to ON and OFF of the shading correction is to be provided. Moreover, when the shading correction is ON, shading at an upper end and a lower end of a photographic field is to be corrected. When the shading correction is OFF, the correction is to be carried out by adjusting a correction value to one of the upper end and the lower end for which the rate of decrease in the amount of light is small, so that the asymmetric shading is not conspicuous.

For instance, in a case of a decrease of −1.7 EV in the amount of light of the lower end of the photographic screen with respect to the center, and a decrease of −1.6 EV in the amount of light of the upper end of the photographic screen with respect to the center, when the shading correction is ON, the correction may be carried out such that the decrease in the amount of light for each becomes −0.3 EV, and when the shading correction is OFF, the correction may be carried out such that the decrease in the amount of light for each becomes −1.6 EV matching with the upper end.

Moreover, in a case of a video photography as against still photography, load on image processing is more. Therefore, it is preferable to eliminate to a possible extent, an image pickup area which necessitates asymmetric correction from a video photography area at the time of video photography.

For instance, it is preferable to capture with an aspect ratio of 4:3 at the time of still photography, and at the time of video photography, to capture with an aspect ratio of 16:9 in an area smaller than the image pickup area at the time of still photography. Or, the image pickup area may be set such that and angle of field is constant for the photography with the aspect ratio of 4:3 and the photography with the aspect ratio of 16:9.

Moreover, when a stroboscopic photography is carried out, the asymmetric shading is susceptible to be conspicuous due to an effect of light distribution characteristics of a stroboscope.

Therefore, an arrangement may be made such that shading correction parameters at the time of setting off the strobe are stored as a separate table, and a correction parameter to be multiplied with each pixel is calculated by multiplying the shading correction parameter of the optical system by the shading correction parameter at the time of setting of the strobe.

Or, the light distribution characteristics may be let to be strobe light distribution characteristics of which, a lower side becomes bright in order to correct the shading by the zoom lens.

Embodiment of Shading Correction

An embodiment in which, a shading correction parameter storage section, a shading correction parameter calculating section, a shading correction section, a noise correction parameter calculating section, a noise correction section, and a distortion correction section are used will be described below.

An apparatus which carries out shading correction will be described below by referring to diagrams from FIG. 15 to FIG. 25A-25P.

Figure 15:
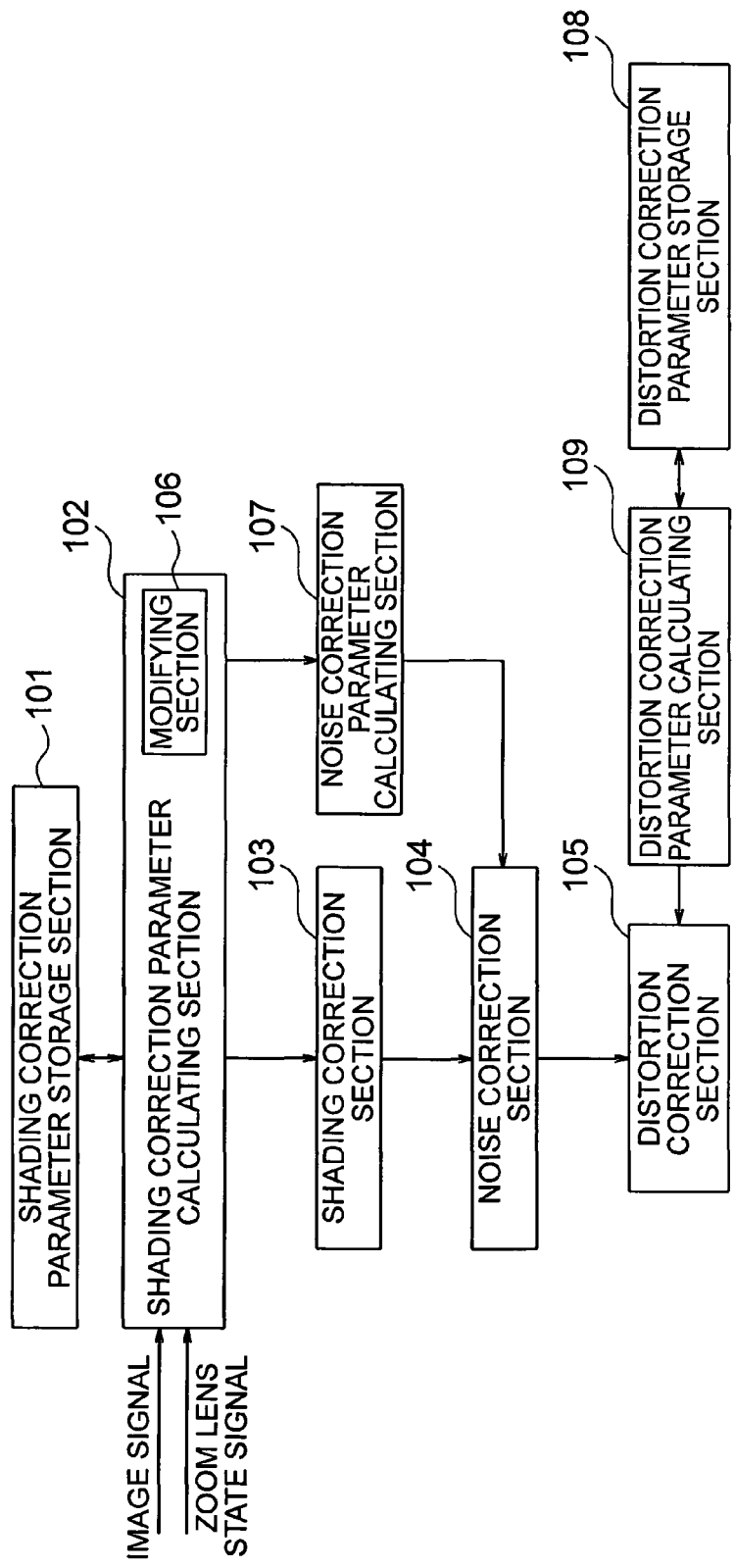
FIG. 15 is a diagram showing functional blocks of the image pickup apparatus.

FIG. 15 is a diagram showing functional blocks of the image pickup apparatus.

A shading correction parameter storage section 101, as an arrangement for correcting the shading electrically, stores shading correction parameters which differ on the front-surface side and the rear-surface side with respect to the center of an image, for correction of asymmetric shading at the front-surface side and the rear-surface side of the zoom lens.

A shading correction section 103 carries out correction operation of an image which has been picked up by the image pickup element, based on the correction parameters of shading which have been stored in the shading correction parameter storage section 101.

A shading correction parameter calculating section 102 reads correction parameters from the shading correction parameter storage section 101.

An image signal and a zoom lens state signal are input to the shading correction parameter calculating section 102.

Shading correction parameter distribution is calculated such that it becomes an inverse function of shading characteristics which change according to the state of the zoom lens.

Moreover, the shading correction parameter calculating section 102 transmits the shading correction parameter distribution which has been calculated, to the shading correction section 103.

The shading correction parameter calculating section 102 includes a shading correction parameter modifying section 106.

The shading correction parameter modifying section 106 carries out an interpolation operation (such as a method of least squares) for calculating the correction parameter distribution in the states of the zoom lens which have not be stored in the correction parameters in the shading correction parameter storage section 101.

The correction parameter distribution which has been calculated by the shading correction parameter calculating section 102 is sent to the shading correction section 103, and is also transmitted to a noise correction parameter calculating section 107.

The shading correction section 103 carries out multiplication of the brightness and the correction parameter for each pixel of the image captured. Accordingly, the shading correction section 103 creates an image for which, the shading correction has been carried out.

The noise correction parameter calculating section 107 calculates noise correction parameter distribution based on the distribution of the shading correction parameters.

An image signal which has been corrected by the shading correction section 103 is sent to the noise correction section 104. The noise correction section 104 makes a noise correction value high for the image signal from the shading correction section 103, in accordance with an area of a high value of the shading correction parameter based on a parameter having a noise correction parameter distribution from the noise correction parameter calculating section 107.

The image signal which has been subjected to noise correction in the noise correction section 104 is sent to a distortion correction section 105. The distortion correction section 105 carries out image processing which corrects the distortion.

At this time, the distortion correction section 105 carries out arithmetic processing of the image signal to correct the distortion by using a correction parameter of the distortion corresponding to the state of the zoom lens. As a result, the distortion correction section 105 outputs an image signal having the distortion corrected.

A distortion correction parameter storage section 108 stores basic correction parameters based on signals indicating the zoom lens state.

A distortion correction parameter calculating section 109 reads a plurality of correction parameters which are close to the corresponding zoom lens state, from the distortion correction parameter storage section 108.

Moreover, the distortion correction parameter calculating section 109 calculates the distortion correction parameter corresponding to the state of the zoom lens, by an operation such as mutual interpolation of the plurality of parameters. A signal from the distortion correction parameter calculating section 109 is sent to the abovementioned distortion correction section 105.

The distortion correction section 105 corrects the distortion of the image based on the correction parameter. It is not shown particularly in the diagram, but an image processing such as a process to emphasize color saturation and a process to reduce rotationally asymmetric oblique incident light may be carried out as further image processing. The image signal which has been converted is displayed as an image on display sections 120 and 47, or is recorded in a recording medium.

Figure 16:
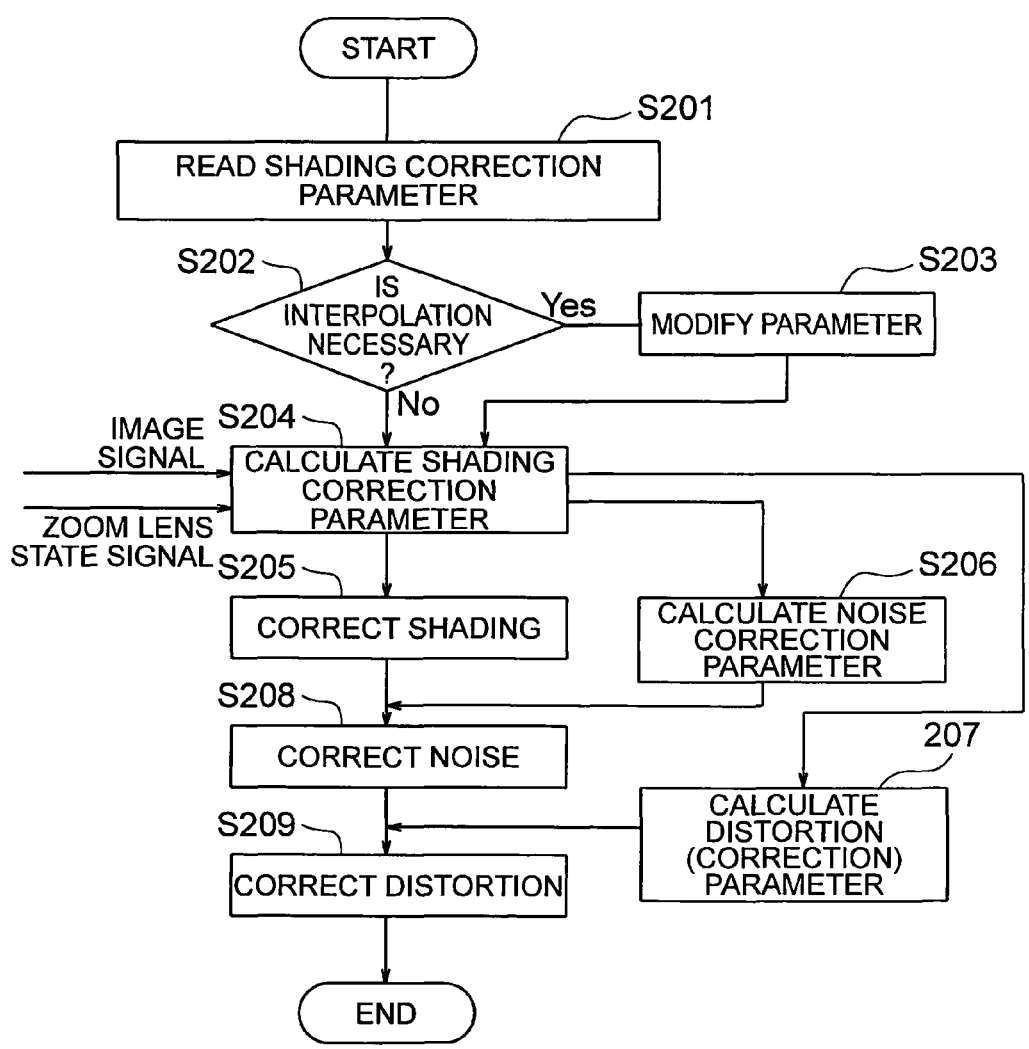
FIG. 16 is a flowchart showing a procedure for correcting shading, a noise, and a distortion.

FIG. 16 is a flowchart showing a procedure for correcting shading, noise, and distortion.

At step S201, the distortion correction parameter calculating section 102 reads the shading correction parameters which are stored in the shading correction parameter storage section 101.

At step S202, the shading correction parameter calculating section 102 makes a judgment of whether or not it is necessary to interpolate the correction parameters. When a judgment result at step S202 is affirmative (Yes), the process advances to step S203.

At step S203, the shading correction parameter modifying section 106 carries out an interpolation operation (such as the method of least squares) for calculating the correction parameter distribution in the zoom lens states which have not been stored in correction parameters in the shading correction parameter storage section 101. Further, the process advances to step S204.

Even when the judgment result at step S202 is negative (No), the process advances to step S204. At step S204, the shading correction parameter calculating section 102 calculates the correction parameter distribution based on the image signal and the zoom lens state signal.

At step S205, the shading correction section 103 carries out correction of shading. Moreover, at step S206, the noise correction parameter calculating section 107 calculates the noise correction parameter distribution based on the correction parameter distribution which has been calculated.

At step S208, the noise correction section 104 makes the noise correction value high for the image signal from the shading correction section 103, in accordance with the area of the high value of the shading correction parameter, based on the parameter having noise correction parameter distribution from the noise correction parameter calculating section 107. Moreover, the noise correction section 104 carries out noise correction for the image.

Moreover, at step S207, the distortion correction parameter calculating section 109 reads the plurality of correction parameters close to the corresponding zoom lens state, from the distortion correction parameter storage section 108. Further, the distortion correction parameter calculating section 109 calculates the distortion correction parameter corresponding to the state of the zoom lens, by an operation such as mutual interpolation of the plurality of parameters.

At step S209, the distortion correction section 105 carries out arithmetic processing of the image signal to correct the distortion, by using the distortion correction parameter corresponding to the state of the zoom lens. As a result, the distortion correction section 105 outputs an image signal having the distortion corrected.

Next, parameters for shading correction will be described below in detail.

The shading correction parameter storage section 101 stores shading correction parameters for which, the distribution becomes an asymmetric distribution in the direction of the short side, corresponding to an asymmetric shading in the direction of the short side of the image pickup element which occurs due to the zoom lens.

Figure 17:
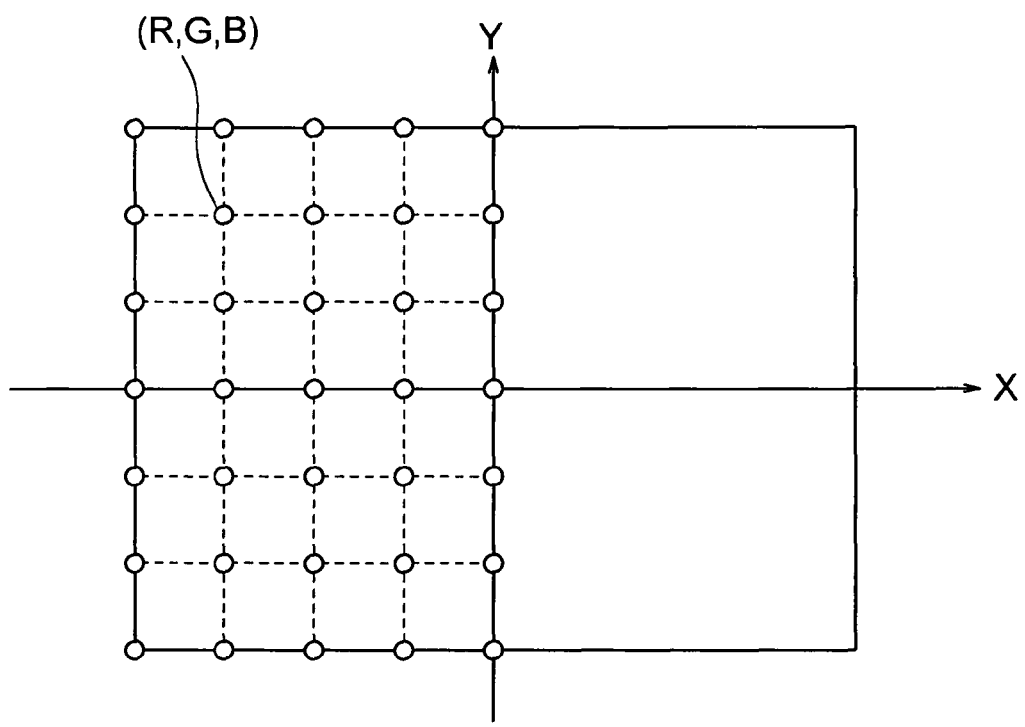
FIG. 17 is a diagram showing positions corresponding to shading correction parameters which are stored as data, by assigning small circles.

FIG. 17 is a diagram showing positions corresponding to the shading correction parameters which are stored as data, by assigning small circles. In the following description, a Y-axis is let to be the direction of the short side of the image pickup area, an X-axis is let to be the direction of the long side of the image pickup area, and a position intersecting with the optical axis of the zoom lens is let to be an origin (center).

As correction parameters to be stored as the shading correction parameters, parameters corresponding to seven pixels from an upper end up to a lower end in the Y-axis direction through the origin are stored. Moreover, parameters corresponding to five pixels from a left end up to the origin in the X-axis direction are stored.

Moreover, in a second quadrant and a third quadrant of coordinates shown in FIG. 17, the shading correction parameter storage section 101 stores correction parameters corresponding to positions of points which are disposed on square grid at equal intervals.

Values of correction parameters may be values which are determined in advance by a method of calculating from an image taken of an object of a uniform brightness as described above, or by simulation by a computer.

The correction parameters stored in the shading correction parameter storage section 101 do not correspond to all pixels. The respective correction parameters are to be interpolated in the shading correction parameter calculating section 102. Accordingly, distribution of correction parameters corresponding to all pixels is to be calculated.

Figure 18A:
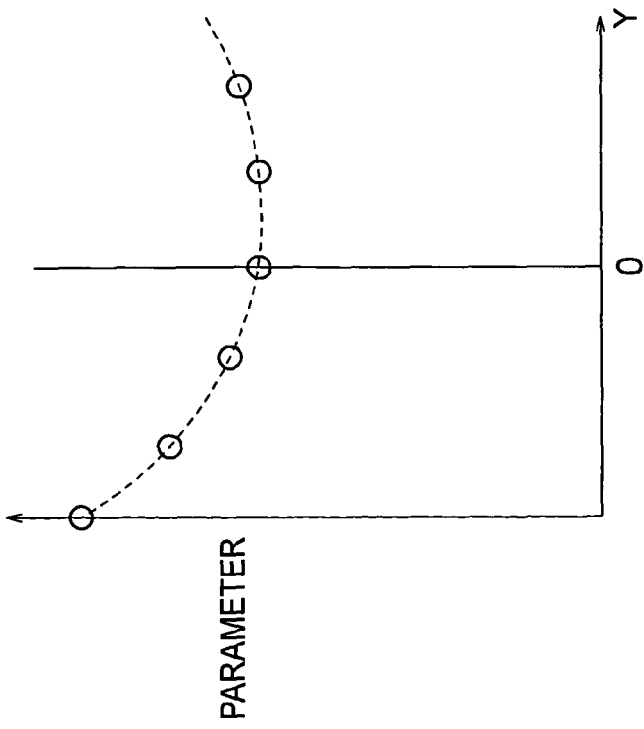
FIG. 18A and FIG. 18B are diagrams showing an interpolation of correction parameters on an X-axis and a Y-axis respectively.
Figure 18B:
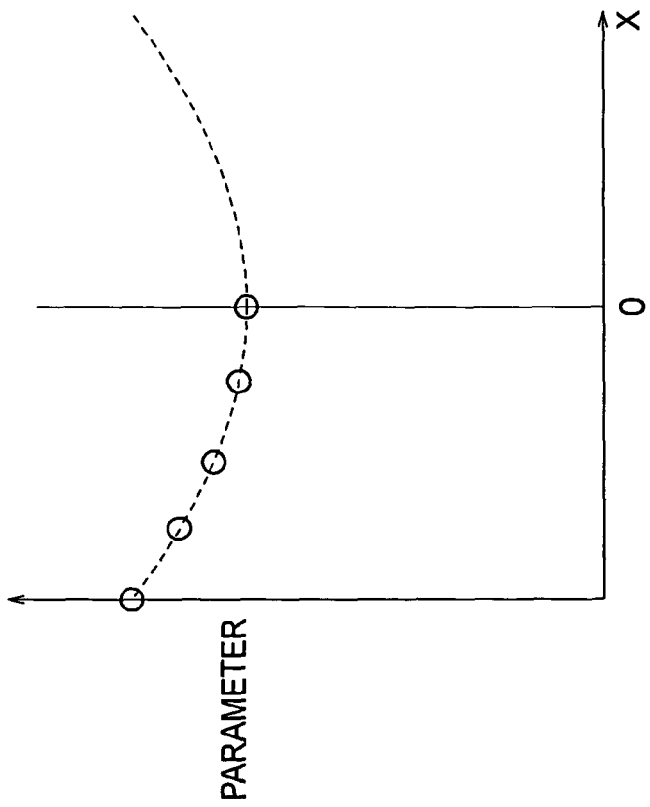

FIG. 18A and FIG. 18B indicate interpolation of correction parameters on an X-axis and a Y-axis respectively.

Correction parameters of the a first quadrant and a second quadrant are let to be values in which, correction parameters in a third quadrant and a fourth quadrant are moved symmetrically with respect to the Y-axis. Accordingly, the number of parameters to be stored in the shading correction parameter storage section 101 is reduced.

Figure 19A:
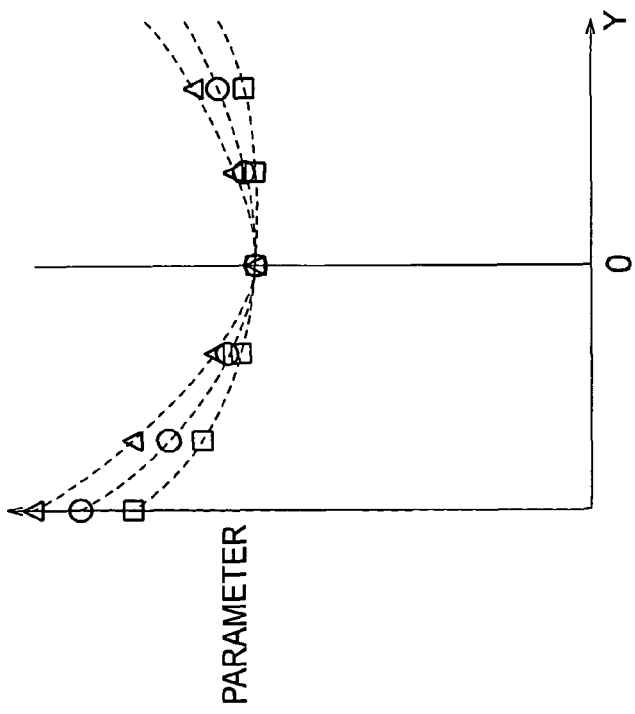
FIG. 19A and FIG. 19B are diagrams showing correction parameters on the X-axis and the Y-axis respectively when R, G, and B filters (filters of R, G, and B colors) are disposed in the image pickup element.
Figure 19B:
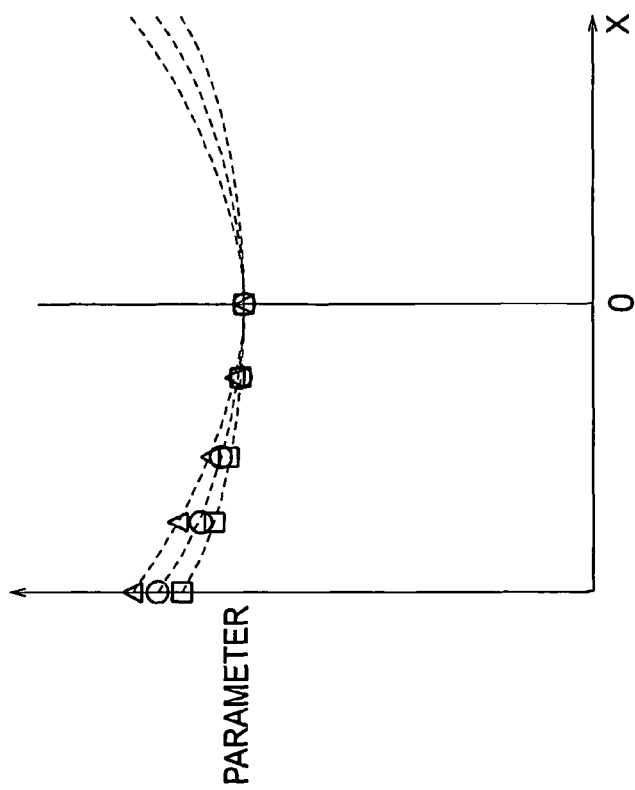

FIG. 19A and FIG. 19B indicate correction parameters on the X-axis and the Y-axis respectively, when filters of R, G, and B are disposed in the image pickup element. The correction parameters may be let to be parameters associated with colors of the R, G, and B filters of the image pickup element.

As it is revealed from FIG. 18B and FIG. 19B, the shading correction parameter which is to be stored in the shading correction parameter storage section 101 has an asymmetric distribution in the direction of the short side corresponding to the asymmetric shading in the direction of short side of the image pickup element which occurs due to the zoom lens.

A group of correction parameters corresponding to one state of the zoom lens is shown below as a table.

FIG. 20 is a diagram showing contents of the table of the correction parameters. The table which is to be stored in the shading correction parameter storage section 101 is a combination of three zooming states namely, a wide angle end, an intermediate focal length state, and a telephoto end, two focusing states namely, when focused at an infinity and when, focused at a close distance, and two aperture states namely when the aperture is open and when the aperture is minimum.

Therefore, the shading correction parameter storage section 101 stores tables in combinations of all the state which are, 3 states×2 states×2 states=12 states. The number of tables may be increased according to a zoom ratio of the zoom lens.

The shading correction parameter calculating section 102 carries out calculation of shading correction parameters corresponding to pixels which are arranged in rows two dimensionally on a flat surface of the image pickup element, based on the shading correction parameters of the shading correction parameter storage section 101.

In the calculation of the shading correction parameters, shading correction coefficients corresponding to pixels which have not been stored in advance are subjected to a linear interpolation, a non-linear interpolation, or an interpolation by the method of least squares.

When the state of the zoom lens does not exist in the table which has been stored in advance, the shading correction parameter calculating section 102 reads a plurality of tables close to the state of that zoom lens. Moreover, the shading correction parameter modifying section 106 calculates by carrying out by weighting corresponding to the state of the zoom lens. Accordingly, a shading correction parameter corresponding to the state of the zoom lens at the time of capturing is calculated.

To cite an example of the shading correction parameter which is to be calculated, a correction parameter of each pixel is determined based on X and Y coordinates of each pixel, when converted to the abovementioned polynomial.

The shading correction section 103 extracts a shading correction coefficient related to the corresponding pixel from among the shading correction parameters which have been calculated by the shading correction parameter calculating section 102. Moreover, the shading correction section 103 carries out correction operation by using the shading correction coefficient, for brightness date which has been selected from the pixels of the image pickup element.

FIG. 21A to FIG. 21G are diagrams explaining the shading correction.

In shading, rotationally symmetric light-amount decrease which depends on an angle of incidence on the optical system and asymmetric light-amount decrease due to vignetting in the optical system are mixed.

Figure 21A:
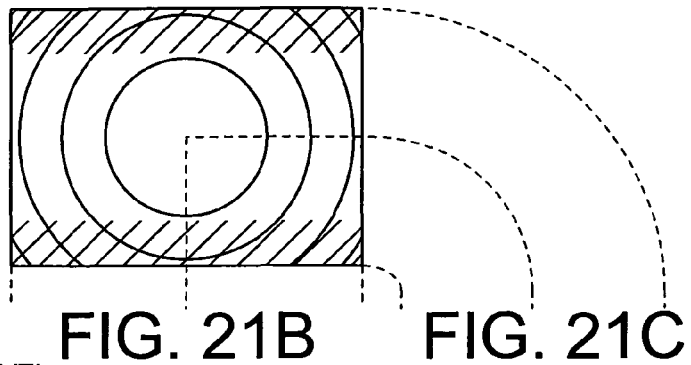
FIG. 21A, FIG. 21B, FIG. 21C, FIG. 21D, FIG. 21E, FIG. 21F, and FIG. 21G (hereinafter, FIG. 21A to FIG. 21G) are diagrams explaining the shading correction.

FIG. 21A is a diagram showing schematically a distribution of an amount of light of an image captured.

Figures 21B, 21C:
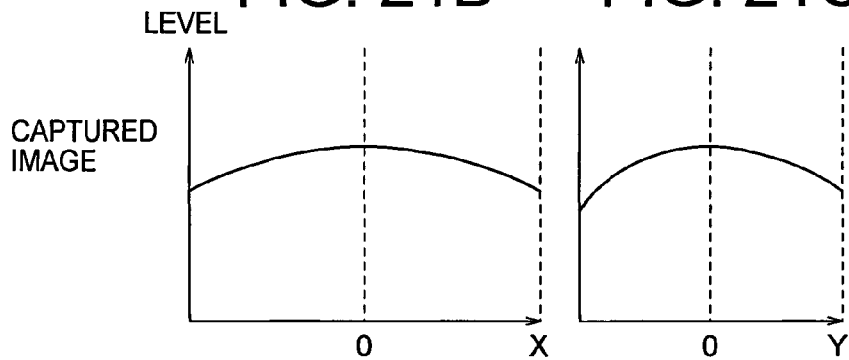

FIG. 21B and FIG. 21C indicate a brightness level in a direction along a direction of a long side, passing through the origin of the image pickup element, and a brightness level in a direction along a direction of a short side, passing through the origin of the image pickup element respectively.

Figures 21D, 21E:
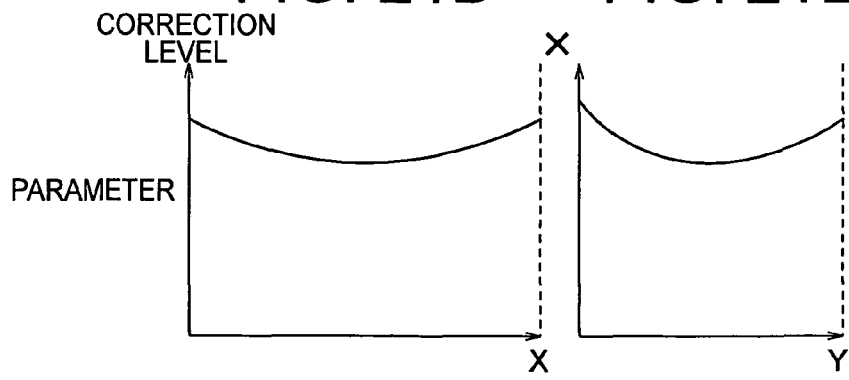

FIG. 21D and FIG. 21E indicate a level of a correction parameter along the direction of the long side, passing through the origin of the image pickup element, and a level of a correction parameter along the direction of the short side, passing through the origin of the image pickup element respectively.

Figures 21F, 21G:
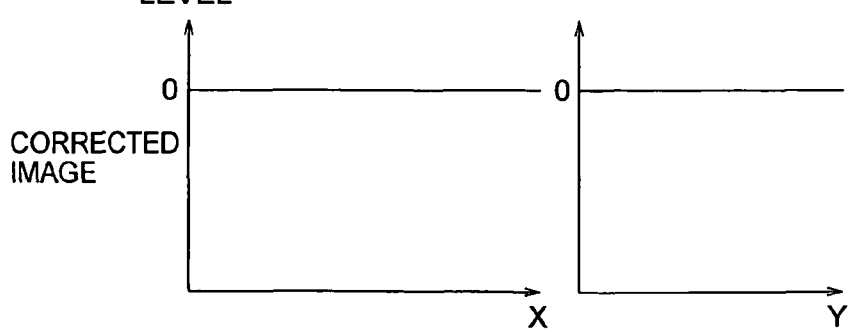

FIG. 21F and FIG. 21G indicate a level after correction in the direction along the direction of the long side, passing through the origin of the image pickup element, and a level after correction along the direction of the short side, passing through the origin of the image pickup element respectively.

Regarding the shading correction parameter distribution in the direction of the short side of the image pickup element, a difference with the shading correction coefficient near the optical axis for the shading correction parameters near an end of the front-surface side is large more than for the shading correction parameters near an end of the rear-surface side in the direction of the short side (Y-axis) on the reference plane.

The shading correction section 103 carries out multiplication correction of shading correction parameter for the brightness data of the image signal. An asymmetric shading recovery process is to be carried out corresponding to the asymmetric decrease in amount of light. Accordingly, the brightness level in an area where the rate of decrease in the amount of light is high is recovered, and it is possible to compensate asymmetry of the decrease in the amount of light.

(Noise Correction)

Next, noise correction will be described below. The noise correction parameter calculating section 107 generates a noise correction parameter of asymmetric correction parameter distribution in the direction of the short side of the image pickup element based on the shading correction parameter.

The noise correction section 104 carries out a noise correction process by using the noise correction parameter. Accordingly, it is possible to carry out noise correction corresponding to the asymmetric noise distribution resulting from the asymmetric shading correction. As a result, it is possible to improve a quality of the image which is captured.

(Distortion Correction)

Next, a distortion correction will be described below. The distortion correction section 105 carries out arithmetic correction of distortion after the correction operation by the shading correction section 103 and the noise correction section 104. To start with, by correcting a phenomenon which occurs non-rotationally symmetrically with respect to the optical axis, an accuracy of image processing is improved.

When the shading correction parameters to be stored in the shading correction parameter storage section 101 are let to be parameters corresponding to each of R (red), G (green), and B (blue) colors of the filter of each pixel, the shading correction section 103 carries out correction operation based on brightness data of each of R (red), G (green), and B (blue) colors.

Accordingly, by carrying out the distortion arithmetic correction separately for each color, a chromatic aberration of magnification is corrected.

Modified Embodiment

Next, a modified embodiment will be described below. The modified embodiment is an example of shading correction parameters which are to be stored in the shading correction parameter storage section 101, and the shading correction parameter calculating section 102.

Figure 22:
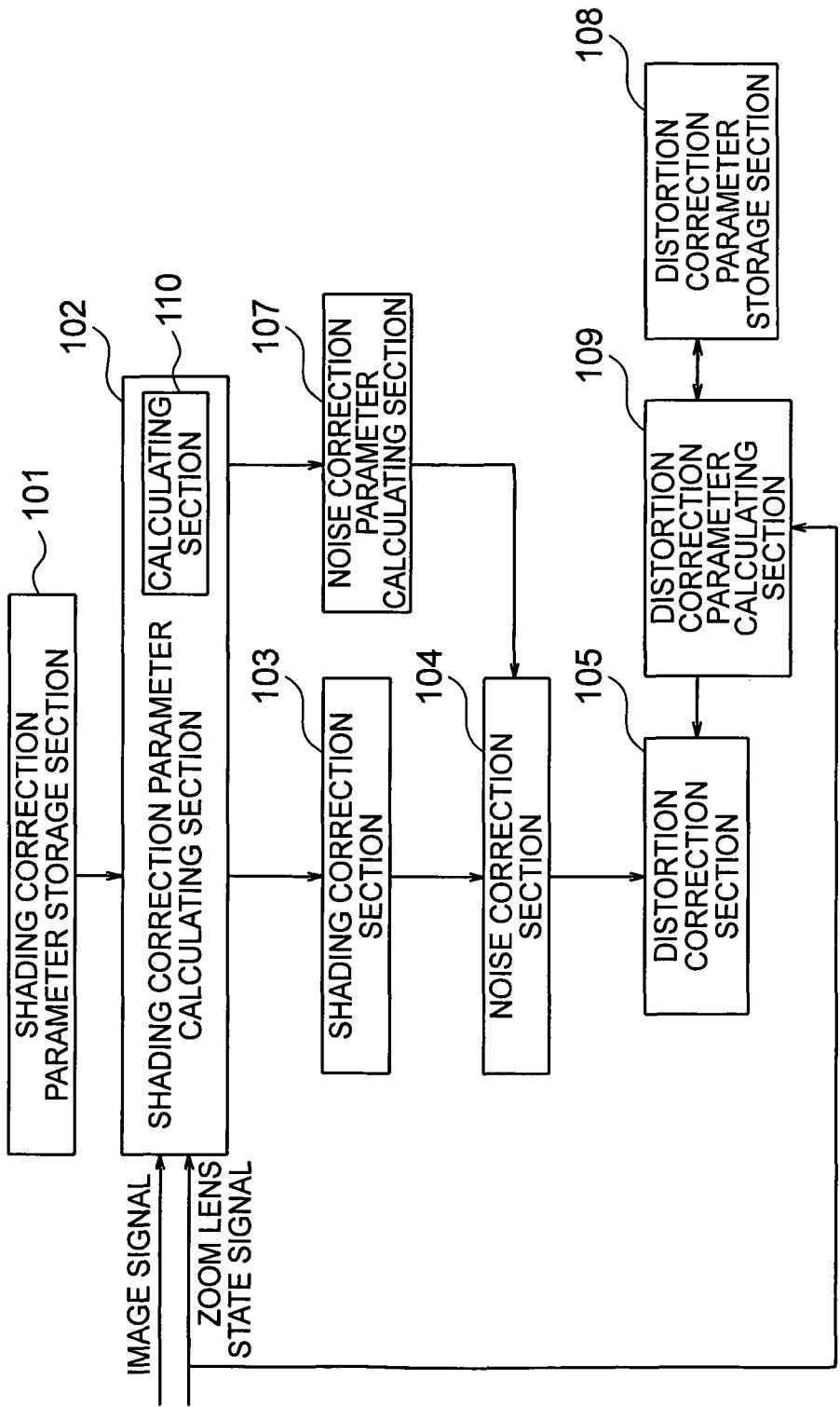
FIG. 22 is a diagram showing functional blocks of an image pickup apparatus according to a modified embodiment (example)

FIG. 22 is a diagram showing functional blocks of an image pickup apparatus according to the modified embodiment.

For correcting decrease in the amount of light based on cosine fourth law of an optical system, a shading correction parameter which becomes a rotationally symmetric distribution with the optical axis as a center is stored in the shading correction parameter storage section 101.

Moreover, apart from the abovementioned shading correction parameter, a shading correction parameter which becomes a non-rotationally symmetric distribution with respect to the optical axis as a center is stored in the shading correction parameter storage section 101.

The shading correction parameter calculating section 102 includes a shading correction parameter adding section 110 (called as an 'adding section' in the diagram).

The shading correction parameter adding section 110 adds the shading correction parameter which becomes the rotationally symmetric distribution and the shading correction parameter which becomes the non-rotationally symmetric distribution, and calculates the shading correction parameter.

The shading correction section 103 carries out correction by multiplying the shading correction parameter which has been calculated by the shading correction parameter calculating section 102, with respect to the brightness data which has been selected from each pixel of the image pickup element.

The shading correction parameter which becomes the rotationally symmetric distribution with the optical axis as a center is stored as a function of which, only an image height H is let to be variable. For example, the correction parameter is indicated by the correction parameter=$D_1H^6+D_2H^5+D_3H^4+D_4H^3+D_5H^2$ ($D_1, D_2, D_3, \ldots$ are parameters).

Figure 24:
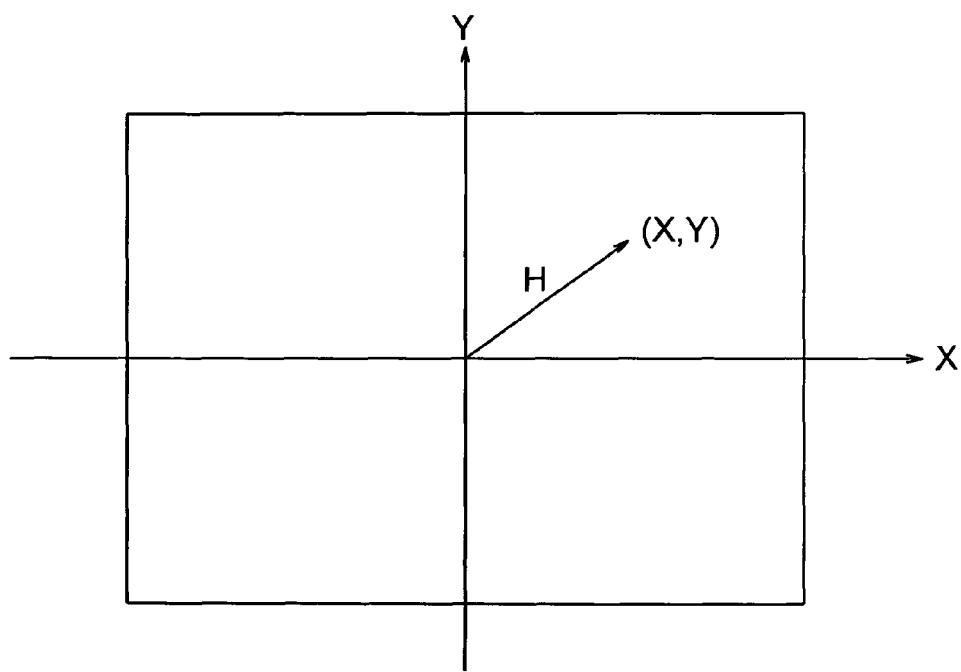
FIG. 24 is a diagram explaining rotationally symmetric correction parameter distribution.

As shown in FIG. 24, the rotationally symmetric correction parameter distribution, at the time of operating in the shading correction parameter calculating section 102, determines the image height (H) at $(X^2+Y^2)$ by an X-Y coordinate of a pixel which is subjected to correction. Moreover, in the correction parameter which is stored as a function, a value corresponding to the image height H is determined and computed.

Moreover, the non-rotationally symmetric shading correction parameters which are stored as the parameter distribution, or the parameter distribution which is determined from the correction parameter which have been stored, are to be added, and a correction parameter distribution corresponding to each pixel is to be calculated.

It is possible to calculate the rotationally symmetric shading by a calculation of that correction coefficient based on the image height. For this reason, it is possible to reduce a storage capacity of a storage section which stores the correction coefficient, and it is advantageous for cost reduction and for improvement of a processing speed.

Furthermore, it is also possible to calculate the correction parameters by the following procedure.

Firstly, a non-rotationally symmetric parameter is to be divided into two components. One of the components (1) is a function parameter of which, only a position in the direction of a short side is let to be variable. For example, the correction parameter is let to be correction parameter=$E_1Y^6+E_2Y^5+E_3Y^4+E_4Y^3+E_5Y^2$ (E1, E2, E3, ... are parameters).

The other component (2) is to be stored as a correction coefficient for correcting the remained shading which has remained in only a part of a surrounding portion.

Moreover, at the time of calculating the parameter distribution, the rotationally symmetric correction, parameter, (1) a correction parameter which depends on the position in the direction of the short side, and (2) an auxiliary correction parameter which is remained are multiplied, and added to find the correction coefficient.

Figure 23:
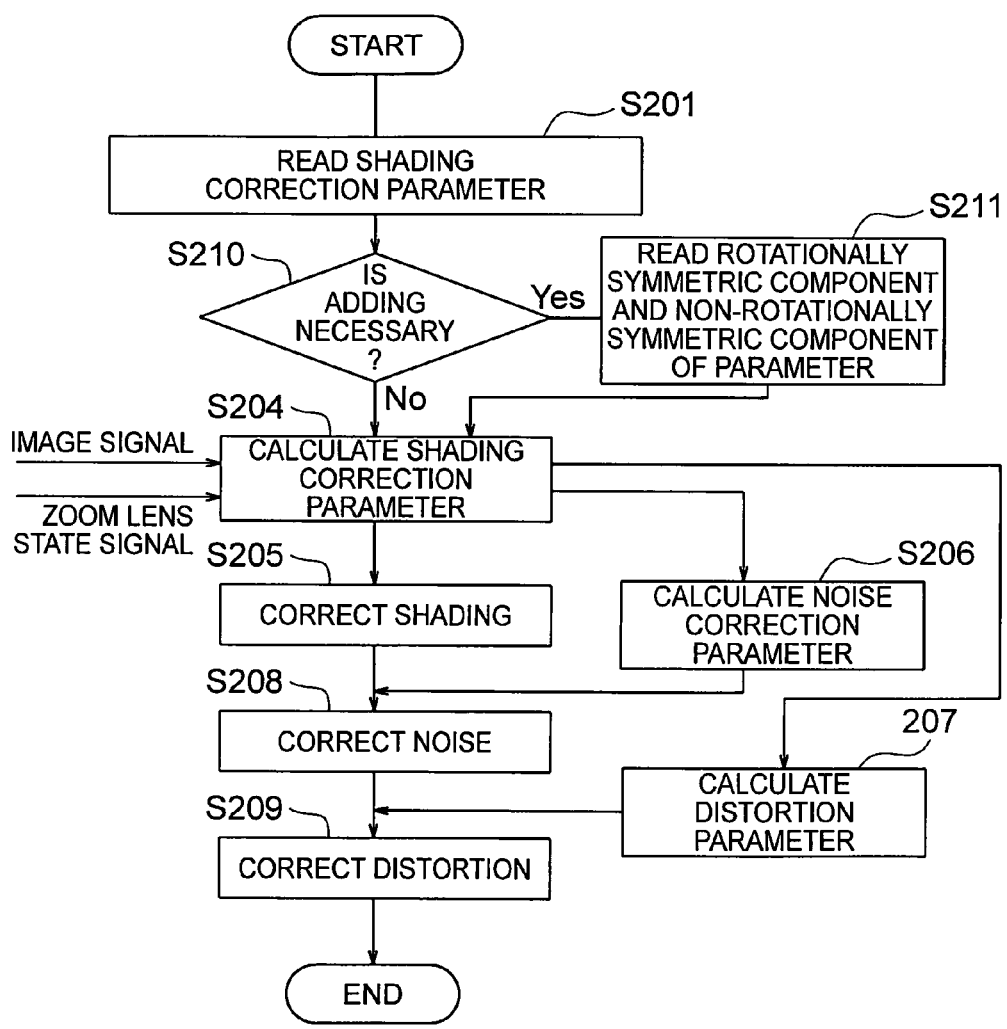
FIG. 23 is a flowchart showing a procedure for correcting the shading, the noise, and the distortion in the modified embodiment.

FIG. 23 is a flowchart showing a procedure for correcting the shading, the noise, and the distortion in the modified embodiment. In this case, same step numbers are assigned to steps which are same as in the flowchart shown in FIG. 16, and the description to be repeated is omitted.

At step S201, the shading correction parameter calculating section 102 reads the shading correction parameters which are stored in the shading correction parameter storage section 101.

At step S210, the shading correction parameter calculating section 102 makes a judgment of whether or not it is necessary to add a rotationally symmetric component and a non-rotationally symmetric component of the correction parameter. When a judgment result at step S210 is affirmative (Yes), the process advances to step S211.

At step S211, the shading correction parameter calculating section 102 reads the shading correction parameter which becomes the rotationally symmetric distribution with respect to the optical axis as a center and the shading correction parameter which becomes the non-rotationally symmetric distribution with respect to the optical axis as a center, stored in the shading correction parameter storage section 101.

Even when the judgment result at step S210 is negative (No), the process advances to step S204.

At step S204, the shading correction parameter adding section 110 in the shading correction parameter calculating section 102 adds the shading correction parameter which becomes the rotationally symmetric distribution and the shading correction parameter which becomes the non-rotationally symmetric distribution, and calculates the shading correction parameter.

Hereafter, a shading correction, a noise correction, and a distortion correction are to be carried out by a procedure basically similar as in FIG. 16.

FIG. 25A to FIG. 25P are diagrams showing schematically steps of calculating such correction parameters.

FIG. 25A shows a component of the rotationally symmetric shading. FIG. 25B shows a component of shading which changes according to a position in the direction of the short side of the image pickup element. FIG. 25C shows a component of an auxiliary shading which has remained. FIG. 25D shows a state in which, all the shading components in FIG. 25A, FIG. 25B, and FIG. 25C are added.

FIG. 25E, FIG. 25F, FIG. 25G, and FIG. 25H show correction parameters on a line along the direction of the long side, with FIG. 25A, FIG. 25B, FIG. 25C, and FIG. 25D passing through the origin of the image pickup element.

FIG. 25I, FIG. 25J, FIG. 25K, and FIG. 25L show correction parameters on a line along the direction of the short side, with FIG. 25A, FIG. 25B, FIG. 25C, and FIG. 25D passing through the origin of the image pickup element.

FIG. 25M, FIG. 25N, FIG. 25O, and FIG. 25P show correction parameters on a Y-axis along the direction of the short side, with FIG. 25A, FIG. 25B, FIG. 25C, and FIG. 25D passing through the origin of the image pickup element.

The abovementioned embodiments may be modified as deemed appropriate.

For instance, in the abovementioned embodiments of the zoom lens, sometimes, light reflected at an IR cut coating causes a ghost image. For rectifying this, by forming a prism having a reflecting surface by an infrared absorbing member, the IR cut coating becomes unnecessary. Or, even when the IR cut coating is used, the amount of light reflected can be reduced. Accordingly, it becomes easy to reduce ghost image.

However, in this case, transmissivity of R in the R, G, and B colors is susceptible to be degraded.

The transmissivity changes according to factors such as an optical-path length inside the prism. In a case of the zoom lens according to the present invention, a shape and an area of an entrance pupil change from the wide angle end up to the telephoto end. Therefore, the change in the transmissivity does not become a rotational symmetry in a precise sense.

Therefore, it is preferable to let the correction parameters to be correction parameters corresponding to an unevenness of color due to an absorption effect of the prism which differs for each of the R, G, and B colors. As a matter of course, as it has been described above, it is preferable to store parameters according to the zoom state and the focusing state.

As it has been described above, the present invention is useful for an optical-path bending camera.

According to the present invention, it is possible to provide an image pickup apparatus which includes a zoom lens of an optical-path bending type which is advantageous for slimming.

What is claimed is:

1. An image pickup apparatus comprising:
a zoom lens; and
an image pickup element; wherein
the image pickup element comprises an image pickup surface which receives an image which has been formed by the zoom lens, and which converts the image received, to an electric signal, and
the zoom lens comprises
an object-side lens unit which comprises
a prism having a reflecting surface which reflects an optical path,
an object-side sub lens unit having a negative refractive power, which is disposed on an object side than the prism,
an aperture stop which is disposed on an image side than the object-side lens unit, and which restricts an axial light beam,
a first zoom lens unit having a positive refractive power, which is disposed on the image side than the aperture stop, and which is moved to carry out zooming, to come closer to the aperture stop, at the telephoto end than at the wide angle end, and
a position of the object-side lens unit is fixed at the time of zooming from the wide angle end to the telephoto end, and the object-side lens unit is a lens unit which is disposed nearest to the object side, and
when a surface which includes an incident-light axis of light incident on the reflecting surface and a reflected-light axis of light upon being reflected at the reflecting surface is defined as a reference surface, and
a side of the incident-light axis with respect to the reflected-light axis is defined as a front-surface side, and
a side opposite to the front-surface side with respect to an optical axis after the reflection is defined as a rear-surface side,
the image pickup element has an effective image pickup area of a rectangular shape having a short side and a long side, and
the short side of the effective image pickup area is parallel to the reference surface, and
the first zoom lens unit has an object-side lens which is disposed nearest to the aperture stop in the first zoom lens unit, and
the object-side lens in the first zoom lens unit has an outer shape which is a non-circular shape of which, the front-surface side and the rear-surface side are cut partly, and
an outer size of the object-side lens, in a direction from an optical axis toward the front-surface side is smaller than an outer size of the object-side lens in a direction from the optical axis toward the rear-surface side, and
when an object having a uniform brightness is captured, the zoom lens, at any state from the wide angle end to the telephoto end, satisfies the following conditional expression (A), and furthermore,
the image pickup apparatus comprises
a shading correction parameter storage section which stores a shading correction parameter which differs at the front-surface side and the rear-surface side with respect to a center of an image, which is for correcting asymmetric shading at the front-surface side and the rear-surface side of the zoom lens, and
a shading correction section which carries out correction operation of an image which has been picked up by the image pickup element, based on the shading correction parameter stored in the shading correction parameter storage section, $$0.02 < EV_r - EV_f < 2.0 \tag{A}$$

where,
$EV_f$ is a value obtained by subtracting an EV value at the maximum image height of the front-surface side along the reference surface at the wide angle end from an EV value in an axial region, and
$EV_r$ is a value obtained by subtracting an EV value at the maximum image height of the rear-surface side along the reference surface at the wide angle end, from the EV value in the axial region.

2. The image pickup apparatus according to claim 1, wherein
the object-side lens in the first zooming lens unit has an object-side lens surface which satisfies the following conditions $$Lv1Er/Lv1EL < 0.49 \tag{1}$$

$$0.93 < Lv1Ef/IHs \tag{2}$$

$$Lv1Ef/Lv1Er < 0.99 \tag{3}$$

where,

Lv1Er denotes a length of an area of the rear-surface side measured along the reference surface from the optical axis, in an effective area of the object-side lens surface of the object-side lens in the first zooming lens unit, Lv1EL denotes a length of an area measured along a direction perpendicular to the reference surface including the optical axis in the effective area of the object-side lens surface of the object-side lens in the first zooming lens unit, Lv1Ef denotes a length of an area of the front-surface side measured along the reference surface from the optical axis, in the effective area of the object-side lens surface of the object-side lens in the first zooming lens unit, and IHs denotes the maximum image height in a direction along the reference surface out of an effective image pickup area.

3. The image pickup apparatus according to claim 1, wherein the prism has an outer shape of which the rear-surface side is cut partially.

4. The image pickup apparatus according to claim 3, wherein
the object-side lens unit includes an image-side sub lens unit having a positive refractive power, which is disposed on the image side than the prism, and
both the prism and the image-side sub lens unit have an outer shape of which the rear-surface side is cut partially.

5. The image pickup apparatus according to claim 1, wherein the image pickup apparatus satisfies the following condition $$PeO < PEr < PEf \quad (4\text{-}1)$$

where,

PEr denotes a length of an area of the rear-surface side measured along the reference surface from the optical axis, in an effective area of an exit surface of the prism in the object-side lens unit, PeO denotes a length from the optical axis of a light ray which passes the nearest position from the optical axis, in the exit surface of the prism, from among light rays which are incident at the maximum image height of the front-surface side on the reference surface at the wide angle end, and PEf denotes a length of an area of the front-surface side measured along the reference surface from the optical axis, in the effective area of the exit surface of the prism in the object-side lens unit.

6. The image pickup apparatus according to claim 5, wherein the image pickup apparatus satisfies the following condition $$Pec \leq PEr \quad (4\text{-}2)$$

where,

PEr denotes the length of the area of the rear-surface side measured along the reference surface from the optical axis in the effective area of the exit surface of the prism in the object-side lens unit, and Pec denotes a length from the optical axis of a position through which a chief ray which is incident at the maximum image height of the front-surface side on the reference surface at the wide angle end passes through the exit surface of the prism.

7. The image pickup apparatus according to claim 5, wherein the image pickup apparatus satisfies the following conditional expression (4-3)

$$Pem \leq PEr \quad (4\text{-}3)$$

where,

PEr denotes the length of the area of the rear-surface side measured along the reference surface from the optical axis, in the effective area of the exit surface of the prism in the object-side lens unit, and Pem denotes a length of an area of the front-surface side along the reference surface from the optical axis in the effective area of the exit surface of the prism at the wide angle end.

8. The image pickup apparatus according to claim 4, wherein the image pickup apparatus satisfies the following conditional expression (6)

$$0.90 < L1rEr/PEr < 1.1 \quad (6)$$

where,

L1rEr denotes a length of an area on the rear-surface side measured along the reference surface from the optical axis, in an effective area of a lens surface on the object side in the image-side sub lens unit in the object-side lens unit, and PEr denotes the length of the area of the rear-surface side measured along the reference surface from the optical axis in the effective area of the exit surface of the prism in the object-side lens unit.

9. The image pickup apparatus according to claim 1, wherein
the image-side sub lens unit in the object-side lens unit has a non-circular shape of which, the front-surface side and the rear-surface side are cut partly, and
an outer size of the image-side sub lens unit, in the direction from the optical axis toward the front-surface side is larger than an outer size in the direction from the optical axis toward the rear-surface side.

10. The image pickup apparatus according to claim 1, wherein the object-side lens in the first zooming lens unit has an object-side lens surface which satisfies the following conditional expression (7)

$$0.70 < Lv1Er/PEr < 0.98 \quad (7)$$

where,

PEr denotes the length of the area of the rear-surface side measured along the reference surface from the optical axis, in the effective area of the exit surface of the prism in the object-side lens unit, and Lv1Er denotes the length of the area of the rear-surface side measured along the reference surface from the optical axis, in the effective area of the object-side lens surface of the object-side lens in the first zooming lens unit.

11. The image pickup apparatus according to claim 1, wherein
the object-side lens unit has a positive refractive power, and
the zoom lens comprises
a second zoom lens unit having a negative refractive power, which is disposed between the object-side lens unit and the aperture stop, and which is moved to carry out zooming, to come closer to the aperture stop, at the telephoto end than at the wide angle end, and
a lens unit having a positive refractive power, which is disposed on the image side of the first zoom lens unit, and
no other lens unit is provided between the first zoom lens unit and the second zoom lens unit.

12. The image pickup apparatus according to claim 11, wherein
the first zoom lens unit comprises
a plurality of positive lens components which are arranged in a row on the object side, and of which an object-side surface is a convex surface, and
a negative lens component which is disposed on the image side than the plurality of positive lens components, and of which an image-side surface is a concave surface.

13. The image pickup apparatus according to claim 1, wherein the zoom lens satisfies the following conditional expression (8)

$$3.4 < fT/fW \qquad (8)$$

where,
fT denotes a focal length of the zoom lens at the telephoto end, and
fW denotes a focal length of the zoom lens at the wide angle end.

14. The image pickup apparatus according to claim 1, wherein the zoom lens satisfies the following conditional expression (8-1)

$$50° > \omega W > 38.0° \qquad (8\text{-}1)$$

where
$\omega W$ denotes the maximum half angle of field of the zoom lens at the wide angle end.

15. The image pickup apparatus according to claim 1, wherein
a center of the image pickup surface of the image pickup element is positioned on the front-surface side with respect to a center of the effective image pickup area, and
the image pickup apparatus comprises:
a display monitor which is disposed on the rear-surface side of the zoom lens.

16. The image pickup apparatus according to claim 1, wherein when the aperture stop is open at the wide angle end, the zoom lens satisfies the following conditional expression (9)

$$-3.5 < EV_{c\text{-}f} < -0.7 \qquad (9)$$

where,
$EV_{c\text{-}f}$ is a value obtained by subtracting an EV value at the maximum image height of the front-surface side along the reference surface at the wide angle end from an EV value in the axial region at the wide angle end.

17. The image pickup apparatus according to claim 1, comprising:
a shading correction parameter calculating section which calculates a shading correction parameter corresponding to each of the pixels which have been arranged in rows two-dimensionally on the flat surface of the image pickup element, based on the shading correction parameters stored in the shading correction parameter storage section, wherein
the shading correction parameter is calculated by an operation of interpolating the shading correction parameter corresponding to pixels, which is not stored in advance, and
the shading correction section carries out correction operation upon extracting a shading correction coefficient related to the corresponding pixel from the shading correction parameter which has been calculated in the shading correction parameter calculating section from luminance data which has been selected from each pixel of the image pickup element.

18. The image pickup apparatus according to claim 17, wherein in a shading correction parameter distribution in a direction of a short side of the image pickup element, a difference with a shading correction coefficient in a near optical axis area for shading correction parameter near an end of the front-surface side is more than for shading correction parameter near an end of the rear-surface side in a direction of short side on the reference surface.

19. The image pickup apparatus according to claim 1, wherein the shading correction section corrects by multiplication, the shading correction parameter for the luminance data.

20. The image pickup apparatus according to claim 17, wherein
the shading correction parameter calculating section comprises
a shading correction parameter modifying section which modifies the shading correction parameter according to at least one of a zooming state of the zoom lens, a focusing state of the zoom lens, and a F number, and transmits the shading correction parameter which has been modified, to the shading correction section.

21. The image pickup apparatus according to claim 1, comprising:
a distortion correction section which carries out an arithmetic correction of a distortion after the correction operation by the shading correction section.

22. The image pickup apparatus according to claim 1, wherein
the shading correction parameter storage section stores shading correction parameters corresponding to each of red, green, and blue colors of the image pickup element, and
the shading correction section carries out shading correction operation based on luminance data of each of red, green, and blue colors.

23. The image pickup apparatus according to claim 17, wherein
the shading correction parameter calculating section calculates an inverse function of shading characteristics, as a shading correction parameter, and
the shading correction section carries out correction by multiplying the luminance data which has been selected from each of the pixels of the image pickup element, by the shading correction parameter.

24. The image pickup apparatus according to claim 17, wherein
the shading correction parameter storage section stores a shading correction parameter which indicates a rotationally symmetric distribution with the optical axis as a center, and a shading correction parameter which indicates a non-rotationally symmetric distribution with respect to a center of the optical axis, and
the shading correction parameter calculating section comprises
a shading correction parameter adding section which calculates a shading correction parameter by adding the shading correction parameter which becomes the rotationally symmetric distribution and the shading correction parameter which becomes the non-rotationally symmetric distribution, and
the shading correction sections carries out correction by multiplying the intensity data which has been selected from each of the pixels of the image pickup element, by the shading correction parameter which has been calculated by the shading correction parameter calculating section.

25. The image pickup apparatus according to claim 17, wherein
- the shading correction parameter which indicates the rotationally symmetric distribution, of the shading correction parameter storage section is a shading correction parameter corresponding to an image height, and
- the shading correction parameter calculating section calculates the shading correction parameter which becomes the rotationally symmetric distribution, based on a distance from a center of the image pickup surface up to a target pixel, and
- calculates the shading correction parameter by adding the shading correction parameter which becomes the rotationally symmetric distribution, and the shading correction parameter which becomes the non-rotationally symmetric distribution.

26. The image pickup apparatus according to claim 1, comprising:
- a noise correction parameter calculating section which creates a noise correction parameter of an asymmetric correction parameter distribution in the direction of the short side of the image pickup element, based on the shading correction parameter; and
- a noise correction section which carries out a noise correction process by using the noise correction parameter.

27. The image pickup apparatus according to claim 1, comprising:
- an interference member which is disposed on the front-surface side of the zoom lens.

\* \* \* \* \*